United States Patent [19]
Boone et al.

[11] Patent Number: 5,587,712
[45] Date of Patent: Dec. 24, 1996

[54] TRANSPONDER HAVING MICROPROCESSOR GENERATED FREQUENCY SHIFT SIGNALS

[75] Inventors: Steven F. Boone, Wood Dale; Edward J. Ho, Bloomingdale, both of Ill.

[73] Assignee: Mark IV Transportation Products Corp., Niles, Ill.

[21] Appl. No.: 151,243

[22] Filed: Nov. 12, 1993

[51] Int. Cl.⁶ .................................................. G08G 1/01
[52] U.S. Cl. ................................................ 342/42; 342/51
[58] Field of Search ........................................ 342/42, 51

[56] References Cited

U.S. PATENT DOCUMENTS

| | | | |
|---|---|---|---|
| 4,983,976 | 1/1991 | Ogata et al. | 342/42 |
| 5,196,846 | 3/1993 | Brockelsby et al. | 342/42 X |
| 5,245,332 | 9/1993 | Katzenstein | 342/44 X |
| 5,278,563 | 1/1994 | Spiess | 342/44 |
| 5,302,954 | 4/1994 | Brooks et al. | 342/44 |

*Primary Examiner*—Mark Hellner
*Attorney, Agent, or Firm*—Francis J. Lidd

[57] ABSTRACT

An improved transponder for use in identifying an controlling vehicles wherein transponders mounted on vehicles respond to signals from a fixed location interrogator providing information relative to the vehicle or other data as required. The transponder disclosed in particular utilizes an improved method of providing frequency shift keyed (FSK) signals in response to a trigger or command signal received from a ground mounted loop or antenna. As disclosed, the transponder of the invention generates FSK signals through programming multiple microprocessor loops of predetermined duration, each loop providing microprocessor highs and lows for transmission to the interrogating station. Utilization of the inherently accurate microprocessor cycle time to generate distinct FSK signals avoids problems with ordinarily used analog frequency generating devices.

6 Claims, 33 Drawing Sheets

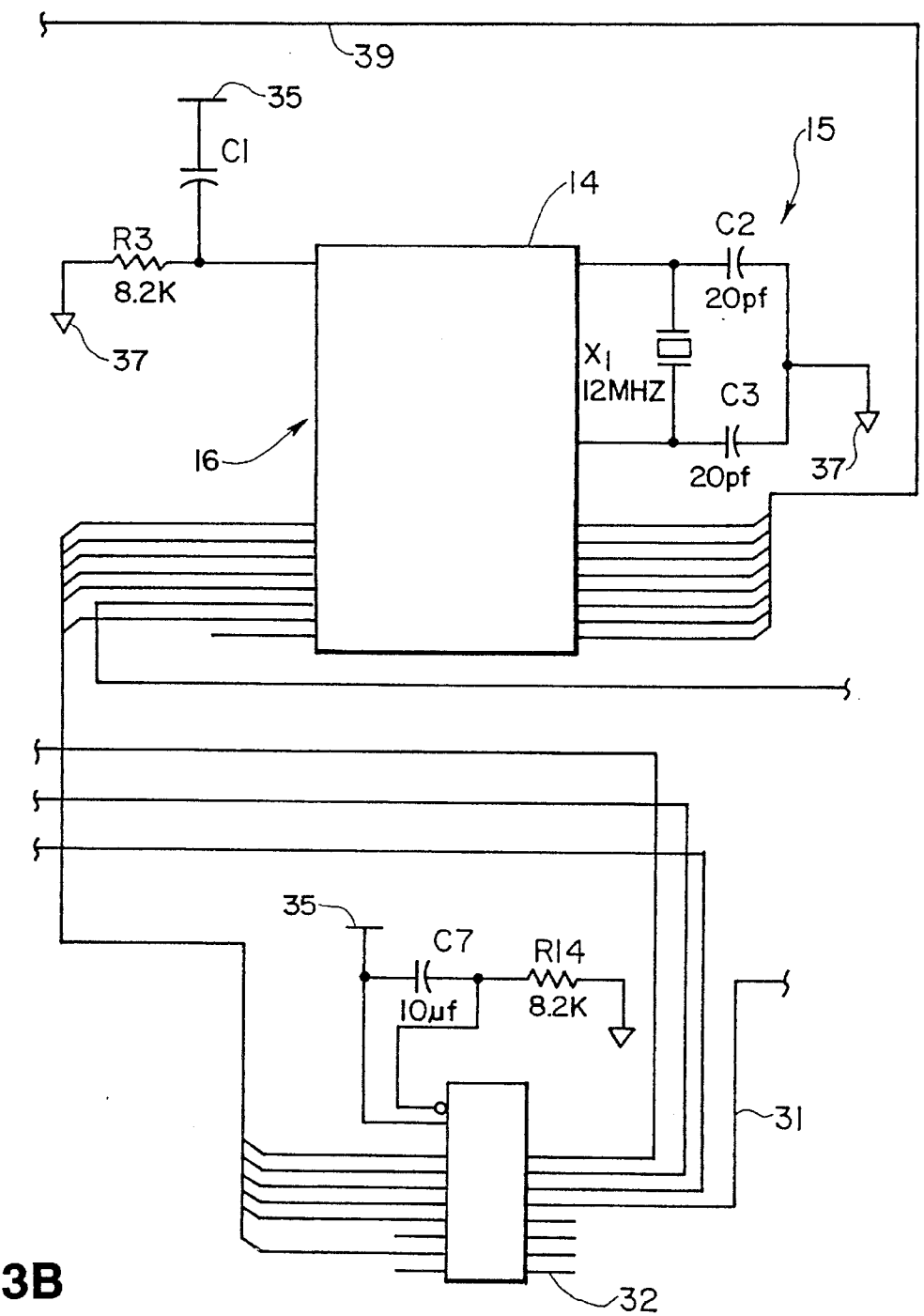
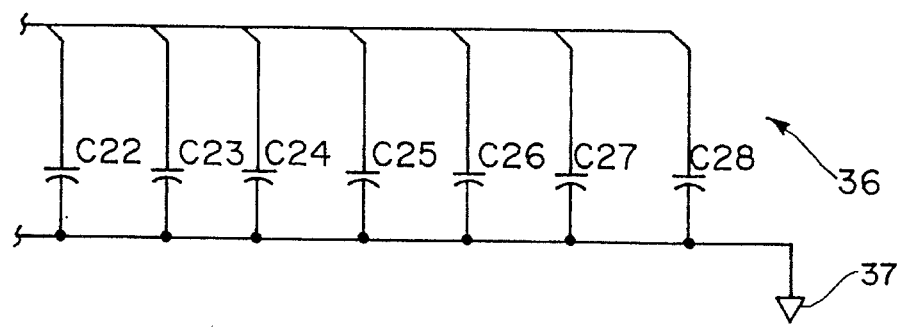
Fig. 3B

REPEAT THE SAME
PROCESS 17 MORE
TIMES FOR DATA BITS

I = LAST OSC AT 100khz   95
O = LAST OSC AT 90khz

PRIOR TO BIT 1   96
IS START BIT
WHICH LAST OSCILLATED
AT 90 khz

| SW BIT | LAST OSC FLAG | OSC. NOW | OSC FLAG | |
|---|---|---|---|---|
| O | O | 100khz | 1 | 104 |
| O | 1 | 90khz | O | 101 |
| 1 | O | 100-90khz | O | |
| 1 | 1 | 90-100khz | O | |

Fig. 13

| PREVIOUS BIT LAST OSCILLATING BIT FREQUENCY at | SWITCH BIT SET VALUE | OSCILLATING FREQUENCY PATTERN |
|---|---|---|
| 90 khz | 0 | ⟵500 uSFC⟶ (1 BIT PERIOD) / 100 khz |
| 100 khz | 0 | 90 khz |
| 90 khz | 1 | ⟵250 usec⟶⟵250 usec⟶ / 100 khz \| 90 khz |
| 100 khz | 1 | 90 khz \| 100 khz |

19 DATA BITS

Fig. 14

| 19 SWITCH BIT LAST OSCILLATING FREQUENCY at | STOP BIT OSCILLATING FREQUENCY PATTERN |
|---|---|
| 90 khz | ⟵500 usec⟶⟵500 usec⟶ / 100 khz \| 90 khz |
| 100 khz | 90 khz \| 100 khz |

2 STOP BITS

```
****************************************************************
*                                                              *
* Archimedes 8051 Assembler V2.01/DOS  14/ Oct/ 91  09:07:45   *
*                                                              *
*      Source  = vxpndb.s03                                    *
*      List    = vxpndb.lst                                    *
*      Object  = vxpndb.obj                                    *
*      Options = p=60                                          *
*                        © Copyright Archimedes 1990           *
*                                                              *
****************************************************************
```

Fig. 15A

```
 1
 2
 3
 4
 5
 6
 7
 8
 9
10
11
12
13
14
15              ; VXPNDB.S03
16              ;
17              ; Vapor Transponder Program
18              ;
19              ; VAPOR, MARK IV INDUSTRIES COPYRIGHT (C) 1991
20              ;
21              ; JANUARY 28, 1991
22              ; APRIL 24, 1991
23              ; AUGUST 12, 1991                    ADD VX OUTPUT
24              ;
25              ; Chip : Signetics 87C751
26              ;
27              ;
28   0000               NAME        VXPNDB
29              ;
30   0000               ASEG
31              ;
32              ;
33              ;       Port and bit assignment
34              ;
35   0090       ENABL_1    EQU     P1.0         ; enable input switches 1-8
36   0091       ENABL_2    EQU     P1.1         ; enable input switches 9-16
37   0092       ENABL_3    EQU     P1.2         ; enable input switches 17-19
38   0093       FSK        EQU     P1.3         ; fsk output
39   0094       VX         EQU     P1.4         ; Vx output for indicator led
40              ;
41              ;           20H = SWITCH 1-8 STORAGE
42              ;           21H = SWITCH 9-16
43              ;           22H = SWITCH 17-19
44              ;
45              ;           23H = OSC @ 100 KHZ FLAG FOR SWITCH 1-8,
```

Fig. 15B

```
46                                  1 MEANS LAST BIT OSC AT 100 KHZ
47              ;            24H = OSC @ 100 KHZ FLAG FOR SWITCH 9 -16
48              ;            25H = OSC @ 100 KHZ FLAG FOR SWITCH 17-19
49              ;
50              ;            P1  : ENABLE SWITCHES READING - FSK - VX - INT 0
51              ;            P2  : NOT USED
52              ;            P3  : SWITCHES READING INPUT
53              ;            INT0 : INTERROGATOR SIGNAL INPUT (P1.5)
54              ;
55              ; Reset and Interupt Table
56              ;
57  0000                     ORG    00H                ; power up reset
58  0000 0140                AJMP   PWR_UP
59              ;
60  0003                     ORG    03H                ; INT 0 (HARDWARE INTERRUPT)
61  0003 0158                AJMP   SCAN_SW            ; Interegating signal
62              ;
63              ;
64              ;
65              ;            MAIN ROUTINE
66              ;
67              ; Power up routine : initialize registers and scan input switches setting
68              ;
69  0040                     ORG    40H                ; MAIN ROUTINE LOCATION
70  0040 759007  PWR_UP:     MOV    P1,#07H            ; DISABLE SWITCHES PORT
71              ;                                        LET Q3 THRU Q7 LOW
72  0043 C2AF                CLR    IE.7               ; NO HARDWARE INTERRUPT
73  0045 75D000              MOV    PSW,#0             ; DEFINE REGISTER BANK 0
74  0048 758130              MOV    SP#30H             ; DEFINE STACK POINTER
75  004B 75F001              MOV    B,#1               ; PREDEFINE B REG
76  004E C28B                CLR    TCON.3             ; CLEAR INT0 FLAG
77  0050 D28A                SETB   TCON.2             ; INT0 IS EDGE TRIGGERED
78  0052 D2AB                SETB   IE.0               ; ENABLE INT0
79              ;
80  0054 D2AF                SETB   IE.7               ; ENABLE MASTER INTRUPT
81
82              ;
83  0056 B0FE   LP_INTRG:    SJMP   LP_INTRG
84              ;
85  0058 C290   SCAN_SW:     CLR    ENABL_1            ; READ SWITCH 1-8
86  005A 85B020              MOV    20H,P3             ; SAVE IN 20H
87  005D D290                SETB   ENABL_1            ;
88  005F C291                CLR    ENABL_2            ; READ SWITCH 9-16
89  0061 85B021              MOV    21H,P3             ; SAVE IN 21H
90  0064 D291                SETB   ENABL_2
91  0066 C292                CLR    ENABL_3            ;READ SWITCH 17-19
92  0068 85B022              MOV    22H,P3             ; SAVE IN 22H
93  006B D292                SETB   ENABL_3
94
95  006D C218   FLG_TBL:     CLR    23H.0              ; START BIT IS 100-90 (KHZ)
96                                                     ; OSC FLAG FOR BIT 1 IS 0
97  006F E520                MOV    A,20H              ; DERIVE OSC FLAG FOR BIT 2
98  0071 6523                XBL    A,23H
99  0073 13                  RRC    A
100 0074 B3                  CPL    C
101 0075 9219                MOV    23H.1,C
102
```

Fig. 15C

| 103 | 0077 E520 | MOV | A,20H | ; DERIVE OSC FLAG FOR BIT 3 |
| 104 | 0079 6523 | XRL | A,23H | |
| 105 | 007B 13 | RRC | A | |
| 106 | 007C 13 | RRC | A | |
| 107 | 007D B3 | CPL | C | |
| 108 | 007E 921A | MOV | 23H.2,C | |
| 109 | | | | |
| 110 | 0080 E520 | MOV | A,20H | ; DERIVE OSC FLAG FOR BIT 4 |
| 111 | 0082 6523 | XRL | A,23H | |
| 112 | 0084 13 | RRC | A | |
| 113 | 0085 13 | RRC | A | |
| 114 | 0086 13 | RRC | A | |
| 115 | 0087 B3 | CPL | C | |
| 116 | 0088 921B | MOV | 23H.3,C | |
| 117 | | | | |
| 118 | 008A E520 | MOV | A,20H | ; DERIVE OSC FLAG FOR BIT 5 |
| 119 | 008C 6523 | XRL | A,23H | |
| 120 | 008E 13 | RRC | A | |
| 121 | 008F 13 | RRC | A | |
| 122 | 0090 13 | RRC | A | |
| 123 | 0091 13 | RRC | A | |
| 124 | 0092 B3 | CPL | C | |
| 125 | 0093 921C | MOV | 23H.4,C | |
| 126 | | | | |
| 127 | 0095 E520 | MOV | A,20H | ; DERIVE OSC FLAG FOR BIT 6 |
| 128 | 0097 6523 | XRL | A,23H | |
| 129 | 0099 33 | RLC | A | |
| 130 | 009A 33 | RLC | A | |
| 131 | 009B 33 | RLC | A | |
| 132 | 009C 33 | RLC | A | |
| 133 | 009D B3 | CPL | C | |
| 134 | 009E 921D | MOV | 23H.5,C | |
| 135 | | | | |
| 136 | 00A0 E520 | MOV | A,20H | ; DERIVE OSC FLAG FOR BIT 7 |
| 137 | 00A2 6523 | XRL | A,23H | |
| 138 | 00A4 33 | RLC | A | |
| 139 | 00A5 33 | RLC | A | |
| 140 | 00A6 33 | RLC | A | |
| 141 | 00A7 B3 | CPL | C | |
| 142 | 00A8 921E | MOV | 23H.6,C | |
| 143 | | | | |
| 144 | 00AA E520 | MOV | A,20H | ; DERIVE OSC FLAG FOR BIT 8 |
| 145 | 00AC 6523 | XRL | A,23H | |
| 146 | 00AE 33 | RLC | A | |
| 147 | 00AF 33 | RLC | A | |
| 148 | 00B0 B3 | CPL | C | |
| 149 | 00B1 921F | MOV | 23H.7,C | |
| 150 | | | | |
| 151 | 00B3 E520 | MOV | A,20H | ; DERIVE OSC FLAG FOR BIT 9 |
| 152 | 00B5 6523 | XRL | A,23H | |
| 153 | 00B7 33 | RLC | A | |
| 154 | 00B8 B3 | CPL | C | |
| 155 | 00B9 9220 | MOV | 24H.0,C | |
| 156 | | | | |
| 157 | 00BB E521 | MOV | A,21H | ; DERIVE OSC FLAG FOR BIT 10 |
| 158 | 00BD 6524 | XRL | A,24H | |
| 159 | 00BF 13 | RRC | A | |

Fig. 15D

```
160   00C0 B3        CPL    C
161   00C1 9221      MOV    24H.1,C
162
163   00C3 E521      MOV    A,21H         ; DERIVE OSC FLAG FOR BIT 11
164   00C5 6524      XRL    A,24H
165   00C7 13        RRC    A
166   00C8 13        RRC    A
167   00C9 B3        CPL    C
168   00CA 9222      MOV    24H.2,C
169
170   00CC E521      MOV    A,21H         ; DERIVE OSC FLAG FOR BIT 12
171   00CE 6524      XRL    A,24H
172   00D0 13        RRC    A
173   00D1 13        RRC    A
174   00D2 13        RRC    A
175   00D3 B3        CPL    C
176   00D4 9223      MOV    24H.3,C
177
178   00D6 E521      MOV    A,21H         ; DERIVE OSC FLAG FOR BIT 13
179   00D8 6524      XRL    A,24H
180   00DA 13        RRC    A
181   00DB 13        RRC    A
182   00DC 13        RRC    A
183   00DD 13        RRC    A
184   00DE B3        CPL    C
185   00DF 9224      MOV    24H.4,C
186     -
187   00E1 E521      MOV    A,21H         ; DERIVE OSC FLAG FOR BIT 14
188   00E3 6524      XRL    A,24H
189   00E5 33        RLC    A
190   00E6 33        RLC    A
191   00E7 33        RLC    A
192   00E8 33        RLC    A
193   00E9 B3        CPL    C
194   00EA 9225      MOV    24H.5,C
195
196   00EC E521      MOV    A,21H         ; DERIVE OSC FLAG FOR BIT 15
197   00EE 6524      XRL    A,24H
198   00F0 33        RLC    A
199   00F1 33        RLC    A
200   00F2 33        RLC    A
201   00F3 B3        CPL    C
202   00F4 9226      MOV    24H.6,C
203
204   00F6 E521      MOV    A,21H         ; DERIVE OSC FLAG FOR BIT 16
205   00F8 6524      XRL    A,24H
206   00FA 33        RLC    A
207   00FB 33        RLC    A
208   00FC B3        CPL    C
209   00FD 9227      MOV    24H.7,C
210
211   00FF E521      MOV    A,21H         ; DERIVE OSC FLAG FOR BIT 17
212   0101 6524      XRL    A,24H
213   0103 33        RLC    A
214   0104 B3        CPL    C
215   0105 9228      MOV    25H.0,C
216
```

Fig. 15E

```
217  0107 E522              MOV    A,22H       ; DERIVE OSC FLAG FOR BIT 18
218  0109 6525              XRL    A,25H
219  010B 13                RRC    A
220  010C B3                CPL    C
221  010D 9229              MOV    25H.1,C
222
223  010F E522              MOV    A,22H       ; DERIVE OSC FLAG FOR BIT 19
224  0111 6525              XRL    A,25H
225  0113 13                RRC    A
226  0114 13                RRC    A
227  0115 B3                CPL    C
228  0116 922A              MOV    25H.2,C
229
230  0118 E522              MOV    A,22H       ; DERIVE OSC FLAG FOR STOP BIT
231  011A 6525              XRL    A,25H
232  011C 13                RRC    A
233  011D 13                RRC    A
234  011E 13                RRC    A
235  011F B3                CPL    C
236  0120 922B              MOV    25H.3,C
237           ;
238  0122 B1E0              ACALL  TMER_1      ; DELAY 1 MSEC
239           ;
240  0124     XMIT_SYNC:
241  0124 D294              SETB   VX          ; TURN ON VX OUTPUT
242  0126 C293   OSC_S1:    CLR    FSK         ; THE FIRST CLK        (1 CYCLE)
243  0128 7831              MOV    R0,#49      ; 49 X 10 USEC LOOP    (2 CYCLES)
244  012A A3                INC    DPTR        ;                      (2 CYCLES)
245  012B D293              SETB   FSK         ; OUT HIGH             (1 CYCLE)
246  012D A4                MUL    AB          ;                      (4 CYCLES)
247           ;
248  012E C293   OUT_S1:    CLR    FSK         ; OUTPUT LOW           (1 CYCLE)
249  0130 A4                MUL    AB          ; DUMMY INSTRUCTION    (4 CYCLES)
250           ;                                  5 CYCLES LOW
251  0131 D293              SETB   FSK         ; OUTPUT HIGH          (1 CYCLE)
252  0133 A3                INC    DPTR        ; DUMMY                (2 CYCLES)
253  0134 D8F8              DJNZ   R0,OUT_S1   ; CONTINUE LOOP        (2 CYCLES)
254           ;                                  5 CYCLES HIGH
255           ;
256  0136 C293   OSC_S2:    CLR    FSK         ; THE FIRST CLOCK      (1 CYCLE)
257  0138 782D              MOV    R0,#45      ; 45 X 11 USEC LOOP    (2 CYCLES)
258  013A A3                INC    DPTR        ;                      (2 CYCLES)
259  013B D293              SETB   FSK         ; OUT HIGH             (1 CYCLE)
260  013D A4                MUL    AB          ;                      (4 CYCLES)
261  013E 00                NOP                ;                      (1 CYCLE)
262           ;
263  013F C293   OUT_S2:    CLR    FSK         ; OUTPUT LOW           (1 CYCLE)
264  0141 A4                MUL    AB          ; DUMMY INSTRUCTION    (4 CYCLES)
265           ;                                  5 CYCLES LOW
266  0142 D293              SETB   FSK         ; OUTPUT HIGH          (1 CYCLE)
267  0144 A3                INC    DPTR        ; DUMMY                (2 CYCLES)
268  0145 00                NOP                ; DUMMY                (1 CYCLE)
269  0146 D8F7              DJNZ   R0,OUT_S2   ; CONTINUE LOOP        (2 CYCLES)
270           ;                                  6 CYCLES HIGH
271  0148 C293   OSC_S3:    CLR    FSK         ;THE FIRST CLK         (1 CYCLE)
272  014A 7831              MOV    R0,#49      ; 49 X 10 USEC LOOP    (2 CYCLES)
273  014C A3                INC    DPTR        ;                      (2 CYCLES)
```

Fig. 15F

| | | | | | | |
|---|---|---|---|---|---|---|
| 274 | 014D D293 | | SETB | FSK | ; OUT HIGH | (1 CYCLE) |
| 275 | 014F A4 | | MUL | AB | ; | (4 CYCLES) |
| 276 | | ; | | | | |
| 277 | 0150 C293 | OUT_S3: | CLR | FSK | ; OUTPUT LOW | (1 CYCLE) |
| 278 | 0152 A4 | | MUL | AB | ; DUMMY INSTRUCTION | (4 CYCLES) |
| 279 | | ; | | | 5 CYCLES LOW | |
| 280 | 0153 D293 | | SETB | FSK | ; OUTPUT HIGH | (1 CYCLE) |
| 281 | 0155 A3 | | INC | DPTR | ; DUMMY | (2 CYCLES) |
| 282 | 0156 D8F8 | | DJNZ | R0,OUT_S3 | ; CONTINUE LOOP | (2 CYCLES) |
| 283 | | ; | | | 5 CYCLES HIGH | |
| 284 | | ; | | | | |
| 285 | 0158 C293 | OSC_S4: | CLR | FSK | ; THE FIRST CLOCK | (1 CYCLE) |
| 286 | 015A 782D | | MOV | R0,#45 | ; 45 X 11 USEC LOOP | (2 CYCLES) |
| 287 | 015C A3 | | INC | DPTR | ; | (2 CYCLES) |
| 288 | 015D D293 | | SETB | FSK | ; OUT HIGH | (1 CYCLE) |
| 289 | 015F A4 | | MUL | AB | ; | (4 CYCLES) |
| 290 | 0160 00 | | NOP | | ; | (1 CYCLE) |
| 291 | | ; | | | | |
| 292 | 0161 C293 | OUT_S4: | CLR | FSK | ; OUTPUT LOW | (1 CYCLE) |
| 293 | 0163 A4 | | MUL | AB | ; DUMMY INSTRUCTION | (4 CYCLES) |
| 294 | | ; | | | 5 CYCLES LOW | |
| 295 | 0164 D293 | | SETB | FSK | ; OUTPUT HIGH | (1 CYCLE) |
| 296 | 0166 A3 | | INC | DPTR | ; DUMMY | (2 CYCLES) |
| 297 | 0167 00 | | NOP | | ; DUMMY | (1 CYCLE) |
| 298 | 0168 D8F7 | | DJNZ | R0,OUT_S4 | ; CONTINUE LOOP | (2 CYCLES) |
| 299 | | ; | | | 6 CYCLES HIGH | |
| 300 | 016A C293 | OSC_S5: | CLR | FSK | ; THE FIRST CLK | (1 CYCLE) |
| 301 | 016C 7831 | | MOV | R0,#49 | ; 49 X 10 USEC LOOP | (2 CYCLES) |
| 302 | 016E A3 | | INC | DPTR | ; | (2 CYCLES) |
| 303 | 016F D293 | | SETB | FSK | ; OUT HIGH | (1 CYCLE) |
| 304 | 0171 A4 | | MUL | AB | ; | (4 CYCLES) |
| 305 | | ; | | | | |
| 306 | 0172 C293 | OUT_S5: | CLR | FSK | ; OUTPUT LOW | (I CYCLE) |
| 307 | 0174 A4 | | MUL | AB | ; DUMMY INSTRUCTION | 4 CYCLES) |
| 308 | | ; | | | 5 CYCLES LOW | |
| 309 | 0175 D293 | | SETB | FSK | ; OUTPUT HIGH | (1 CYCLE) |
| 310 | 0177 A3 | | INC | DPTR | ; DUMMY | (2 CYCLES) |
| 311 | 0178 D8F8 | | DJNZ | R0, OUT_S5 | ; CONTINUE LOOP | (2 CYCLES) |
| 312 | | ; | | | 5 CYCLES HIGH | |
| 313 | | ; | | | | |
| 314 | 017A C293 | OSC_S6: | CLR | FSK | ; THE FIRST CLOCK | (1 CYCLE) |
| 315 | 017C 782D | | MOV | R0,#45 | ; 45 X 11 USEC LOOP | (2 CYCLES) |
| 316 | 017E A3 | | INC | DPTR | ; | (2 CYCLES) |
| 317 | 017F D293 | | SETB | FSK | ; OUT HIGH | (1 CYCLE) |
| 318 | 0181 A4 | | MUL | AB | ; | (4 CYCLES) |
| 319 | 0182 00 | | NOP | | ; | (1 CYCLE) |
| 320 | | ; | | | | |
| 321 | 0183 C293 | OUT_S6: | CLR | FSK | ; OUTPUT LOW | (1 CYCLE) |
| 322 | 0185 A4 | | MUL | AB | ; DUMMY INSTRUCTION | (4 CYCLES) |
| 323 | | ; | | | 5 CYCLES LOW | |
| 324 | 0186 D293 | | SETB | FSK | ; OUTPUT HIGH | (1 CYCLE) |
| 325 | 0188 A3 | | INC | DPTR | ; DUMMY | (2 CYCLES) |
| 326 | 0189 00 | | NOP | | ; DUMMY | (1 CYCLE) |
| 327 | 018A D8F7 | | DJNZ | R0, OUT S_6 | ; CONTINUE LOOP | (2 CYCLES) |
| 328 | | ; | | | 6 CYCLES HIGH | |
| 329 | 018C C293 | OSC_S7: | CLR | FSK | ; THE FIRST CLK | (1 CYCLE) |
| 330 | 018E 7831 | | MOV | R0,#49 | ; 49 X 10 USEC LOOP | (2 CYCLES) |

Fig. 15G

| | | | | | | |
|---|---|---|---|---|---|---|
| 331 | 0190 A3 | | INC | DPTR | ; | (2 CYCLES) |
| 332 | 0191 D293 | | SETB | FSK | ; OUT HIGH | (1 CYCLE) |
| 333 | 0193 A4 | | MUL | AB | ; | (4 CYCLES) |
| 334 | | ; | | | | |
| 335 | 0194 C293 | OUT_S7: | CLR | FSK | ; OUTPUT LOW | (1 CYCLE) |
| 336 | 0199 A4 | | MUL | AB | ; DUMMY INSTRUCTION | (4 CYCLES) |
| 337 | | ; | | | 5 CYCLES LOW | |
| 338 | 0197 D293 | | SETB | FSK | ; OUTPUT HIGH | (1 CYCLE) |
| 339 | 0199 A3 | | INC | DPTR | ; DUMMY | (2 CYCLES) |
| 340 | 019A D8F8 | | DJNZ | R0,OUT_S7 | ; CONTINUE LOOP | (2 CYCLES) |
| 341 | | ; | | | 5 CYCLES HIGH | |
| 342 | | ; | | | | |
| 343 | 019C C293 | OSC_S8: | CLR | FSK | ; THE FIRST CLOCK | (1 CYCLE) |
| 344 | 019E 782D | | MOV | R0,#45 | ; 45 X 11 USEC LOOP | (2 CYCLES) |
| 345 | 01A0 A3 | | INC | DPTR | ; | (2 CYCLES) |
| 346 | 01A1 D293 | | SETB | FSK | ; OUT HIGH | (1 CYCLE) |
| 347 | 01A3 A4 | | MUL | AB | ; | (4 CYCLES) |
| 348 | 01A4 00 | | NOP | | ; | (1 CYCLE) |
| 349 | | ; | | | | |
| 350 | 01A5 C293 | OUT_S8: | CLR | FSK | ; OUTPUT LOW | (1 CYCLE) |
| 351 | 01A7 A4 | | MUL | AB | ; DUMMY INSTRUCTION | (4 CYCLES) |
| 352 | | ; | | | 5 CYCLES LOW | |
| 353 | 01A8 D293 | | SETB | FSK | ; OUTPUT HIGH | (1 CYCLE) |
| 354 | 01AA A3 | | INC | DPTR | ; DUMMY | (2 CYCLES) |
| 355 | 01AB 00 | | NOP | | ; DUMMY | (1 CYCLE) |
| 356 | 01AC D8F7 | | DJNZ | R0,OUT_S8 | ; CONTINUE LOOP | (2 CYCLES) |
| 357 | | ; | | | 6 CYCLES HIGH | |
| 358 | 01AE C293 | OSC_S9: | CLR | FSK | ; THE FIRST CLK | (1 CYCLE) |
| 359 | 01B0 7831 | | MOV | R0,#49 | ; 49 X 10 USEC LOOP | (2 CYCLES) |
| 360 | 01B2 A3 | | INC | DPTR | ; | (2 CYCLES) |
| 361 | 01B3 D293 | | SETB | FSK | ; OUT HIGH | (1 CYCLE) |
| 362 | 01B5 A4 | | MUL | AB | ; | (4 CYCLES) |
| 363 | | ; | | | | |
| 364 | 01B6 C293 | OUT_S9: | CLR | FSK | ; OUTPUT LOW | (1 CYCLE) |
| 365 | 01B8 A4 | | MUL | AB | ; DUMMY INSTRUCTION | (4 CYCLES) |
| 366 | | ; | | | 5 CYCLES LOW | |
| 367 | 01B9 D293 | | SETB | FSK | ; OUTPUT HIGH | (1 CYCLE) |
| 368 | 01BB A3 | | INC | DPTR | ; DUMMY | (2 CYCLES) |
| 369 | 01BC D8F8 | | DJNZ | R0, OUT_S9 | ; CONTINUE LOOP | (2 CYCLES) |
| 370 | | ; | | | 5 CYCLES HIGH | |
| 371 | | ; | | | | |
| 372 | 01BE C293 | OSC_SA: | CLR | FSK | ; THE FIRST CLOCK | (1 CYCLE) |
| 373 | 01C0 782D | | MOV | R0,#45 | ; 45 X 11 USEC LOOP | (2 CYCLES) |
| 374 | 01C2 A3 | | INC | DPTR | ; | (2 CYCLES) |
| 375 | 01C3 D293 | | SETB | FSK | ; OUT HIGH | (1 CYCLE) |
| 376 | 01C5 A4 | | MUL | AB | ; | (4 CYCLES) |
| 377 | 01C6 00 | | NOP | | ; | (1 CYCLE) |
| 378 | | ; | | | | |
| 379 | 01C7 C293 | OUT_SA: | CLR | FSK | ; OUTPUT LOW | (1 CYCLE) |
| 380 | 01C9 A4 | | MUL | AB | ; DUMMY INSTRUCTION | (4 CYCLES) |
| 381 | | ; | | | 5 CYCLES LOW | |
| 382 | 01CA D293 | | SETB | FSK | ; OUTPUT HIGH | (1 CYCLE) |
| 383 | 01CC A3 | | INC | DPTR | ; DUMMY | (2 CYCLES) |
| 384 | 01CD 00 | | NOP | | ; DUMMY | (1 CYCLE) |
| 385 | 01CE D8F7 | | DJNZ | R0, OUT_SA | ; CONTINUE LOOP | (2 CYCLES) |
| 386 | | ; | | | 6 CYCLES HIGH | |
| 387 | 01D0 C293 | OSC_S_A9: | CLR | FSK | ; THE FIRST CLK | (1 CYCLE) |

Fig. 15H

```
388   01D2 7818              MOV    R0,#24            ; 24 X 10 USEC LOOP    (2 CYCLES)
389   01D4 A3                INC    DPTR              ;                       (2 CYCLES)
390   01D5 D293              SETB   FSK               ; OUT HIGH              (1 CYCLE)
391   01D7 A4                MUL    AB                ;                       (4 CYCLES)
392                     ;
393   01D8 C293   OUT_SL3:   CLR    FSK               ; OUTPUT LOW            (1 CYCLE)
394   01DA A4                MUL    AB                ; DUMMY INSTRUCTION    (4 CYCLES)
395                     ;                               5 CYCLES LOW
396   01DB D293              SETB   FSK               ; OUTPUT HIGH           (1 CYCLE)
397   01DD A3                INC    DPTR              ; DUMMY                 (2 CYCLES)
398   01DE D8F8              DJNZ   R0,OUT_SL3        ; CONTINUE LOOP         (2 CYCLES)
399                     ;                               5 CYCLES HIGH
400                     ;                              COMPLETE 250 USEC @ 100 KHZ
401                     ;
402   01E0 C293              CLR    FSK               ; 90 KHZ FIRST CLOCK    (1 CYCLE)
403   01E2 7815              MOV    R0,#21            ; 21 X 11 USEC LOOP     (2 CYCLES)
404   01E4 A3                INC    DPTR              ;                       (2 CYCLES)
405   01E5 D293              SETB   FSK               ; OUT HIGH              (1 CYCLE)
406   01E7 A4                MUL    AB                ;                       (4 CYCLES)
407   01E8 00                NOP                      ;                       (1 CYCLE)
408                     ;
409   01E9 C293   OUT_SL4:   CLR    FSK               ; OUTPUT LOW            (1 CYCLE)
410   01EB A4                MUL    AB                ; DUMMY INSTRUCTION    (4 CYCLES)
411                     ;                              .5 CYCLES LOW
412   01EC D293              SETB   FSK               ; OUTPUT HIGH           (1 CYCLE)
413   01EE A3                INC    DPTR              ; DUMMY                 (2 CYCLES)
414   01EF 00                NOP                      ; DUMMY                 (1 CYCLE)
415   01F0 D8F7              DJNZ   R0,OUT_SL4        ; CONTINUE LOOP         (2 CYCLES)
416                     ;                              .6 CYCLES HIGH
417   01F2 C293              CLR    FSK               ; THE LAST CLOCK        (1 CYCLE)
418   01F4 A4                MUL    AB                ;                       (4 CYCLES)
419   01F5 D293              SETB   FSK               ; OUT HIGH              (1 CYCLE)
420   01F7 00                NOP                      ;                       (1 CYCLE)
421   01F8 A4                MUL    AB                ;                       (4 CYCLES)
422
423                     ; Transmit 19 bits...
424   01F9 C293   XMIT_1_8:  CLR    FSK
425   01FB 200012 XMIT_1:    JB     20H.0,X1_1                ; BIT 1
426   01FE 201807            JB     23H.0,X1_0_9
427   0201 D293              SETB   FSK
428   0203 A3                INC    DPTR
429   0204 B15E              ACALL  OSC_A
430   0206 801A              SJMP   XMIT_2
431   0208 D293   X1_0_9:    SETB   FSK
432   020A A3                INC    DPTR
433   020B 00                NOP
434   020C B175              ACALL  OSC_9
435   020E 8012              SJMP   XMIT_2
436   0210 201807 X1_1:      JB     23H.0,X1_0_9A
437   0213 D293              SETB   FSK
438   0215 A3                INC    DPTR
439   0216 B18E              ACALL  OSC_A_9
440   0218 8008              SJMP   XMIT_2
441   021A D293   X1_1_9A:   SETB   FSK
442   021C A3                INC    DPTR
443   021D 00                NOP
444   021E B1B7              ACALL  OSC_9_A
```

Fig. 15I

| 445 | 0220 8000 | | SJMP | XMIT_2 | |
|---|---|---|---|---|---|
| 446 | | ; | | | |
| 447 | 0222 C293 | XMIT_2: | CLR | FSK | |
| 448 | 0224 200112 | | JB | 20H.1,X2_1 | ; BIT 2 |
| 449 | 0227 201907 | | JB | 23H.1,X2_0_9 | |
| 450 | 022A D293 | | SETB | FSK | |
| 451 | 022C A3 | | INC | DPTR | |
| 452 | 002D B15E | | ACALL | OSC_A | |
| 453 | 022F 801A | | SJMP | XMIT_3 | |
| 454 | 0231 D293 | X2_0_9: | SETB | FSK | |
| 455 | 0233 A3 | | INC | DPTR | |
| 456 | 0234 00 | | NOP | | |
| 457 | 0235 B175 | | ACALL | OSC_9 | |
| 458 | 0237 8012 | | SJMP | XMIT_3 | |
| 459 | 0239 201907 | X2_1: | JB | 23H.1,X2_0_9A | |
| 460 | 023C D293 | | SETB | FSK | |
| 461 | 023E A3 | | INC | DPTR | |
| 462 | 023F B18E | | ACALL | OSC_A_9 | |
| 463 | 0241 8008 | | SJMP | XMIT_3 | |
| 464 | 0243 D293 | X2_1_9A: | SETB | FSK | |
| 465 | 0245 A3 | | INC | DPTR | |
| 466 | 0246 00 | | NOP | | |
| 467 | 0247 B1B7 | | ACALL | OSC_9_A | |
| 468 | 0249 8000 | | SJMP | XMIT_3 | |
| 469 | | ; | | | |
| 470 | 024B C293 | XMIT_3: | CLR | FSK | |
| 471 | 024D 200212 | | JB | 20H.2,X3_1 | ; BIT 3 |
| 472 | 0250 201A07 | | JB | 23H.2,X3_0_9 | |
| 473 | 0253 D293 | | SETB | FSK | |
| 474 | 0255 A3 | | INC | DPTR | |
| 475 | 0256 B15E | | ACALL | OSC_A | |
| 476 | 0258 801A | | SJMP | XMIT_4 | |
| 477 | 025A D293 | X3_0_9: | SETB | FSK | |
| 478 | 025C A3 | | INC | DPTR | |
| 479 | 025D 00 | | NOP | | |
| 480 | 025E B175 | | ACALL | OSC_9 | |
| 481 | 0260 8012 | | SJMP | XMIT_4 | |
| 482 | 0262 201A07 | X3_1: | JB | 23H.2,X3_1_9A | |
| 483 | 0265 D293 | | SETB | FSK | |
| 484 | 0267 A3 | | INC | DPTR | |
| 485 | 0268 B18E | | ACALL | OSC_A_9 | |
| 486 | 026A 8008 | | SJMP | XMIT_4 | |
| 487 | 026C D293 | X3_1_9A: | SETB | FSK | |
| 488 | 026E A3 | | INC | DPTR | |
| 489 | 026F 00 | | NOP | | |
| 490 | 0270 B1B7 | | ACALL | OSC_9_A | |
| 491 | 0272 8000 | | SJMP | XMIT_4 | |
| 492 | | ; | | | |
| 493 | 0274 C293 | XMIT_4: | CLR | FSK | |
| 494 | 0276 200312 | | JB | 20H.3,X4_1 | ; BIT 4 |
| 495 | 0279 201B07 | | JB | 23H.3,X4_0_9 | |
| 496 | 027C D293 | | SETB | FSK | |
| 497 | 027E A3 | | INC | DPTR | |
| 498 | 027F B15E | | ACALL | OSC_A | |
| 499 | 0281 801A | | SJMP | XMIT_5 | |
| 500 | 0283 D293 | X4_0_9: | SETB | FSK | |
| 501 | 0285 A3 | | INC | DPTR | |

Fig. 15J

```
502  0286 00              NOP
503  0287 B175             ACALL   OSC_9
504  0289 8012             SJMP    XMIT_5
505  028B 201B07  X4_1:    JB      23H.3,X4_1_9A
506  028E D293             SETB    FSK
507  0290 A3               INC     DPTR
508  0291 B18E             ACALL   OSC_A_9
509  0293 8008             SJMP    XMIT_5
510  0295 D293   X4_1_9A:  SETB    FSK
511  0297 A3               INC     DPTR
512  0298 00               NOP
513  0299 B1B7             ACALL   OSC_9_A
514  029B 8000             SJMP    XMIT_5
515                ;
516  029D C293   XMIT_5:   CLR     FSK
517  029F 200412           JB      20H.4,X5_1           ; BIT 5
518  02A2 201C07           JB      23H.4,X5_0_9
519  02A5 D293             SETB    FSK
520  02A7 A3               INC     DPTR
521  02A8 B15E             ACALL   OSC_A
522  02AA 801A             SJMP    XMIT_6
523  02AC D293   X5_0_9:   SETB    FSK
524  02AE A3               INC     DPTR
525  02AF 00               NOP
526  02B0 B175             ACALL   OSC_9
527  02B2 8012             SJMP    XMIT_6
528  02B4 201C07  X5_1:    JB      23H.4,X5_1_9A
529  02B7 D293             SETB    FSK
530  02B9 A3               INC     DPTR
531  02BA B18E             ACALL   OSC_A_9
532  02BC 8008             SJMP    XMIT_6
533  02BE D293   X5_1_9A:  SETB    FSK
534  02C0 A3               INC     DPTR
535  02C1 00               NOP
536  02C2 B1B7             ACALL   OSC_9_A
537  02C4 8000             SJMP    XMIT_6
538                ;
539  02C6 C293   XMIT_6:   CLR     FSK
540  02C8 200512           JB      20H.5,X6_1           ; BIT 6
541  02CB 201D07           JB      23H.5,X6_0_9
542  02CE D293             SETB    FSK
543  02D0 A3               INC     DPTR
544  02D1 B15E             ACALL   OSC_A
545  02D3 801A             SJMP    XMIT_7
546  02D5 D293   X6_0_9:   SETB    FSK
547  02D7 A3               INC     DPTR
548  02D8 00               NOP
549  02D9 B175             ACALL   OSC_9
550  02DB 8012             SJMP    XMIT_7
551  02DD 201D07  X6_1:    JB      23H.5,X6_1_9A
552  02E0 D293             SETB    FSK
553  02E2 A3               INC     DPTR
554  02E3 B18E             ACALL   OSC_A_9
555  02E5 8008             SJMP    XMIT_7
556  02E7 D293   X6_1_9A:  SETB    FSK
557  02E9 A3               INC     DPTR
558  02EA 00               NOP
```

Fig. 15K

```
559  02EB B1B7              ACALL   OSC_9_A
560  02ED 8000              SJMP    XMIT_7
561                  ;
562  02EF C293     XMIT_7:  CLR     FSK
563  02F1 200612            JB      20H.6,X7_1            ; BIT 7
564  02F4 201E07            JB      23H.6,X7_0_9
565  02F7 D293              SETB    FSK
566  02F9 A3                INC     DPTR
567  02FA B15E              ACALL   OSC_A
568  02FC 801A              SJMP    XMIT_8
569  02FE D293     X7_0_9:  SETB    FSK
570  0300 A3                INC     DPTR
571  0301 00                NOP
572  0302 B175              ACALL   OSC_9
573  0304 8012              SJMP    XMIT_8
574  0306 201E07  X7_1:     JB      23H.6,X7_1_9A
575  0309 D293              SETB    FSK
576  030B A3                INC     DPTR
577  030C B18E              ACALL   OSC_A_9
578  030E 8008              SJMP    XMIT_8
579  0310 D293    X7_1_9A:  SETB    FSK
580  0312 A3                INC     DPTR
581  0313 00                NOP
582  0314 B1B7              ACALL   OSC_9_A
583  0316 8000              SJMP    XMIT_8
584                   ;
585  0318 C293    XMIT_8:   CLR     FSK
586  031A 200712            JB      20H.7,X8_1            ; BIT 8
587  031D 201F07            JB      23H.7,X8_0_9
588  0320 D293              SETB    FSK
589  0322 A3                INC     DPTR
590  0323 B15E              ACALL   OSC_A
591  0325 801A              SJMP    XMIT_9
592  0327 D293    X8_0_9:   SETB    FSK
593  0329 A3                INC     DPTR
594  032A 00                NOP
595  032B B175              ACALL   OSC_9
596  032D 8012              SJMP    XMIT_9
597  032F 201F07  X8_1:     JB      23H.7,X8_1_9A
598  0332 D293              SETB    FSK
599  0334 A3                INC     DPTR
600  0335 B18E              ACALL   OSC_9_A
601  0337 8008              SJMP    XMIT_9
602  0339 D293    X8_1_9A:  SETB    FSK
603  033B A3                INC     DPTR
604  033C 00                NOP
605  033D B1B7              ACALL   OSC_9_A
606  033F 8000              SJMP    XMIT_9
607
608                  ; XMIT_9_16
609  0341 C293    XMIT_9:   CLR     FSK
610  0343 200812            JB      21H.0,X9_1            ; BIT 9
611  0346 202007            JB      24H.0,X9_0_9
612  0349 D293              SETB    FSK
613  034B A3                INC     DPTR
614  034C B15E              ACALL   OSC_A
615  034E 801A              SJMP    XMIT_10
```

Fig. 15L

```
616   0350 D293   X9_0_9:   SETB    FSK
617   0352 A3               INC     DPTR
618   0353 00               NOP
619   0354 B175             ACALL   OSC_9
620   0356 8012             SJMP    XMIT_10
621   0358 202007 X9_1:     JB      24H.0,X9_1_9A
622   035B D293             SETB    FSK
623   035D A3               INC     DPTR
624   035E B18E             ACALL   OSC_A_9
625   0360 8008             SJMP    XMIT_10
626   0632 D293   X9_1_9A:  SETB    FSK
627   0364 A3               INC     DPTR
628   0365 00               NOP
629   0366 B1B7             ACALL   OSC_9_A
630   0368 8000             SJMP    XMIT_10
631               ;
632   036A C293   XMIT_10:  CLR     FSK
633   036C 200912           JB      21H.1,X10_1              ; BIT 10
634   036F 202107           JB      24H.1,X10_0_9
635   0372 D293             SETB    FSK
636   0374 A3               INC     DPTR
637   0375 B15E             ACALL   OSC_A
638   0377 801A             SJMP    XMIT_11
639   0379 D293   X10_0_9:  SETB    FSK
640   037B A3               INC     DPTR
641   037C 00               NOP
642   037D B175             ACALL   OSC_9
643   037F 8012             SJMP    XMIT_11
644   0381 202107 X10_1:    JB      24H.1,X10_1_9A
645   0384 D293             SETB    FSK
646   0386 A3               INC     DPTR
647   0387 B18E             ACALL   OSC_A_9
648   0389 8008             SJMP    XMIT_11
649   038B D293   X10_1_9A: SETB    FSK
650   038D A3               INC     DPTR
651   038E 00               NOP
652   038F B1B7             ACALL   OSC_9_A
653   0391 8000             SJMP    XMIT_11
654               ;
655   0393 C293   XMIT_11:  CLR     FSK
656   0395 200A12           JB      21H.2,X11_1              ; BIT 11
657   0398 202207           JB      24H.2,X11_0_9
658   039B D293             SETB    FSK
659   093D A3               INC     DPTR
660   039E B15E             ACALL   OSC_A
661   03A0 801A             SJMP    XMIT_12
662   03A2 D293   X11_0_9:  SETB    FSK
663   03A4 A3               INC     DPTR
664   03A5 00               NOP
665   03A6 B175             ACALL   OSC_9
666   03A8 8012             SJMP    XMIT_12
667   03AA 202207 X11_1:    JB      24H.2,X11_1_9A
668   03AD D293             SETB    FSK
669   03AF A3               INC     DPTR
670   03B0 B18E             ACALL   OSC_A_9
671   03B2 8008             SJMP    XMIT_12
672   03B4 D293   X11_1_9A: SETB    FSK
```

Fig. 15M

```
673   03B6 A3              INC     DPTR
674   03B7 00              NOP
675   03B8 B1B7            ACALL   OSC_9_A
676   03BA 8000            SJMP    XMIT_12
677                ;
678   03BC C293   XMIT_12: CLR     FSK
679   03BE 200B12          JB      21H.3,X12_1         ; BIT 12
680   03C1 202307          JB      24H.3,X12_0_9
681   03C4 D293            SETB    FSK
682   03C6 A3              INC     DPTR
683   03C7 B15E            ACALL   OSC_A
684   03C9 801A            SJMP    XMIT_13
685   03CB D293   X12_0_9: SETB    FSK
686   03CD A3              INC     DPTR
687   03CE 00              NOP
688   03CF B175            ACALL   OSC_9
689   03D1 8012            S       XMIT_13
690   03D3 202307 X12_1:   JB      24H.3,X12_1_9A
691   03D6 D293            SETB    FSK
692   03D8 A3              INC     DPTR
693   03D9 B18E            ACALL   OSC_A_9
694   03DB 8008            SJMP    XMIT_13
695   03DD D293   X12_1_9A: SETB   FSK
696   03DF A3              INC     DPTR
697   03E0 00              NOP
698   03E1 B1B7            ACALL   OSC_9_A
699   03E3 8000            SJMP    XMIT_13
700                ;
701   03E5 C293   XMIT_13: CLR     FSK
702   03E7 200C12          JB      21H.4,X13_1         ; BIT 13
703   03EA 202407          JB      24H.4,X13_0_9
704   03ED D293            SETB    FSK
705   03EF A3              INC     DPTR
706   03F0 B15E            ACALL   OSC_A
707   03F2 801A            SJMP    XMIT_14
708   03F4 D293   X13_0_9: SETB    FSK
709   03F6 A3              INC     DPTR
710   03F7 00              NOP
711   03F8 B175            ACALL   OSC_9
712   03FA 8012            SJMP    XMIT_14
713   03FC 202407 X13_1:   JB      24H.4,X13_1_9A
714   03FF D293            SETB    FSK
715   0401 A3              INC     DPTR
716   0402 B18E            ACALL   OSC_A_9
717   0404 8008            SJMP    XMIT_14
718   0406 D293   X13_1_9A: SETB   FSK
719   0408 A3              INC     DPTR
720   0409 00              NOP
721   040A B1B7            ACALL   OSC_9_A
722   040C 8000            SJMP    XMIT_14
723                ;
724   040E C293   XMIT_14: CLR     FSK
725   0410 200D12          JB      21H.5,X14_1         ; BIT 14
726   0413 202507          JB      24H.5,X14_0_9
727   0416 D293            SETB    FSK
728   0418 A3              INC     DPTR
729   0419 B15E            ACALL   OSC_A
```

Fig. 15N

| | | | | | |
|---|---|---|---|---|---|
| 730 | 041B 801A | | SJMP | XMIT_15 | |
| 731 | 041D D293 | X14_0_9: | SETB | FSK | |
| 732 | 041F A3 | | INC | DPTR | |
| 733 | 0420 00 | | NOP | | |
| 734 | 0421 B175 | | ACALL | OSC_9 | |
| 735 | 0423 8012 | | SJMP | XMIT_15 | |
| 736 | 0425 202507 | X14_1: | JB | 24H.5,X14_1_9A | |
| 737 | 0428 D293 | | SETB | FSK | |
| 738 | 042A A3 | | INC | DPTR | |
| 739 | 042B B18E | | ACALL | OSC_A_9 | |
| 740 | 042D 8008 | | SJMP | XMIT_15 | |
| 741 | 042F D293 | X14_1_9A: | SETB | FSK | |
| 742 | 0431 A3 | | INC | DPTR | |
| 743 | 0432 A3 | | NOP | | |
| 744 | 0433 B1B7 | | ACALL | OSC_9_A | |
| 745 | 0435 8000 | | SJMP | XMIT_15 | |
| 746 | | ; | | | |
| 747 | 0437 C293 | XMIT_15: | CLR | FSK | |
| 748 | 0439 200E12 | | JB | 21H.6,X15_1 | ; BIT 15 |
| 749 | 043C 202607 | | JB | 24H.6,X15_0_9 | |
| 750 | 043F D293 | | SETB | FSK | |
| 751 | 0441 A3 | | INC | DPTR | |
| 752 | 0442 B15E | | ACALL | OSC_A | |
| 753 | 0444 801A | | SJMP | XMIT_16 | |
| 754 | 0446 D293 | X15_0_9: | SETB | FSK | |
| 755 | 0448 A3 | | INC | DPTR | |
| 756 | 0449 00 | | NOP | | |
| 757 | 044A B175 | | ACALL | OSC_9 | |
| 758 | 044C 8012 | | SJMP | XMIT_16 | |
| 759 | 044E 202607 | X15_1: | JB | 24H.6,X15_1_9A | |
| 760 | 0451 D293 | | SETB | FSK | |
| 761 | 0453 A3 | | INC | DPTR | |
| 762 | 0454 B18E | | ACALL | OSC_A_9 | |
| 763 | 0456 8008 | | SJMP | XMIT_16 | |
| 764 | 0458 D293 | X15_1_9A: | SETB | FSK | |
| 765 | 045A A3 | | INC | DPTR | |
| 766 | 045B 00 | | NOP | | |
| 767 | 045C B1B7 | | ACALL | OSC_9_A | |
| 768 | 045E 8000 | | SJMP | XMIT_16 | |
| 769 | | ; | | | |
| 770 | 0460 C293 | XMIT_16: | CLR | FSK | |
| 771 | 0462 200F12 | | JB | 21H.7,X16_1 | ; BIT 16 |
| 772 | 0465 202707 | | JB | 24H.7,X16_0_9 | |
| 773 | 0468 D293 | | SETB | FSK | |
| 774 | 046A A3 | | INC | DPTR | |
| 775 | 046B B15E | | ACALL | OSC_A | |
| 776 | 046D 801A | | SJMP | XMIT_17 | |
| 777 | 046F D293 | X16_0_9: | SETB | FSK | |
| 778 | 0471 A3 | | INC | DPTR | |
| 779 | 0472 00 | | NOP | | |
| 780 | 0473 B175 | | ACALL | OSC_9 | |
| 781 | 0475 8012 | | SJMP | XMIT_17 | |
| 782 | 0477 202707 | X16_1: | JB | 24H.7,X16_1_9A | |
| 783 | 047A D293 | | SETB | FSK | |
| 784 | 047C A3 | | INC | DPTR | |
| 785 | 047D B18E | | ACALL | OSC_A_9 | |
| 786 | 047F 8008 | | SJMP | XMIT_17 | |

Fig. 15O

```
787   0481 D293    X16_1_9A: SETB    FSK
788   0483 A3                INC     DPTR
789   0484 00                NOP
790   0485 B1B7              ACALL   OSC_9_A
791   0487 8000              SJMP    XMIT_17
792                 ; XMIT_17_19
793                 ;
794   0489 C293    XMIT_17:  CLR     FSK
795   048B 201012            JB      22H.0,X17_1        ; BIT 17
796   048E 202807            JB      25H.0,X17_0_9
797   0491 D293              SETB    FSK
798   0493 A3                INC     DPTR
799   0494 B15E              ACALL   OSC_A
800   0496 801A              SJMP    XMIT_18
801   0498 D293    X17_0_9:  SETB    FSK
802   049A A3                INC     DPTR
803   049B 00                NOP
804   049C B175              ACALL   OSC_9
805   049E 8012              SJMP    XMIT_18
806   04A0 202807  X17_1:    JB      25H.0,X17_1_9A
807   04A3 D293              SETB    FSK
808   04A5 A3                INC     DPTR
809   04A6 B18E              ACALL   OSC_A_9
810   04A8 8008              SJMP    XMIT_18
811   04AA D293    X17_1_9A: SETB    FSK
812   04AC A3                INC     DPTR
813   04AD 00                NOP
814   04AE B1B7              ACALL   OSC_9_A
815   04B0 8000              SJMP    XMIT_18
816                 ;
817   04B2 C293    XMIT_18:  CLR     FSK
818   04B4 201112            JB      22H.1,X18_1        ; BIT 18
819   04B7 202907            JB      25H.1,X18_0_9
820   04BA D293              SETB    FSK
821   04BC A3                INC     DPTR
822   04BD B15E              ACALL   OSC_A
823   04BF 801A              SJMP    XMIT_19
824   04C1 D293    X18_0_9:  SETB    FSK
825   04C3 A3                INC     DPTR
826   04C4 00                NOP
827   04C5 B175              ACALL   OSC_9
828   04C7 8012              SJMP    XMIT_19
829   04C9 202907  X18_1:    JB      25H.1,X18_1_9A
830   04CC D293              SETB    FSK
831   04CE A3                INC     DPTR
832   04CF B18E              ACALL   OSC_A_9
833   04D1 8008              SJMP    XMIT_19
834   04D3 D293    X18_1_9A: SETB    FSK
835   04D5 A3                INC     DPTR
836   04D6 00                NOP
837   04D7 B1B7              ACALL   OSC_9_A
838   04D9 8000              SJMP    XMIT_19
839                 ;
840   04DB C293    XMIT_19:  CLR     FSK
841   04DD 201212            JB      22H.2,X19_1        ; BIT 19
842   04E0 202A07            JB      25H.2,X19_0_9
843   04E3 D293              SETB    FSK
```

Fig. 15P

| | | | | | | |
|---|---|---|---|---|---|---|
| 844 | 04E5 A3 | | INC | DPTR | | |
| 845 | 04E6 B15E | | ACALL | OSC_A | | |
| 846 | 04E8 801A | | SJMP | XMIT_STOP | | |
| 847 | 04EA D293 | X19_0_9: | SETB | FSK | | |
| 848 | 04EC A3 | | INC | DPTR | | |
| 849 | 04ED 00 | | NOP | | | |
| 850 | 04EE B175 | | ACALL | OSC_9 | | |
| 851 | 04F0 8012 | | SJMP | XMIT_STOP | | |
| 852 | 04F2 202A07 | X19_1: | JB | 25H.2,X19_1_9A | | |
| 853 | 04F5 D293 | | SETB | FSK | | |
| 854 | 04F7 A3 | | INC | DPTR | | |
| 855 | 04F8 B18E | | ACALL | OSC_A_9 | | |
| 856 | 04FA 8008 | | SJMP | XMIT_STOP | | |
| 857 | 04FC D293 | X19_1_9A: | SETB | FSK | | |
| 858 | 04FE A3 | | INC | DPTR | | |
| 859 | 04FF 00 | | NOP | | | |
| 860 | 0500 B1B7 | | ACALL | OSC_9_A | | |
| 861 | 0502 8000 | | SJMP | XMIT_STOP | | |
| 862 | | ; | | | | |
| 863 | | ; | | | | |
| 864 | 0504 202B24 | XMIT_STOP | JB | 25H.3,XSTP_9 | ; 2 STOP BITS | |
| 865 | 0507 C293 | OSC_SB: | CLR | FSK | ; THE FIRST CLK | (1 CYCLE) |
| 866 | 0509 7831 | | MOV | R0,#49 | ; 49 X 10 USEC LOOP | (2 CYCLES) |
| 867 | 050B A3 | | INC | DPTR | ; | (2 CYCLES) |
| 868 | 050C D293 | | SETB | FSK | ; OUT HIGH | (1 CYCLE) |
| 869 | 050E A4 | | MUL | AB | ; | (4 CYCLES) |
| 870 | | ; | | | | |
| 871 | 050F C293 | OUT_SB: | CLR | FSK | ; OUTPUT LOW | (1 CYCLE) |
| 872 | 0511 A4 | | MUL | AB | ; DUMMY INSTRUCTION | (4 CYCLES) |
| 873 | | ; | | | 5 CYCLES LOW | |
| 874 | 0512 D293 | | SETB | FSK | ; OUTPUT HIGH | (1 CYCLE) |
| 875 | 0514 A3 | | INC | DPTR | ; DUMMY | (2 CYCLES) |
| 876 | 0515 D8F8 | | DJNZ | R0,OUT_SB | ; CONTINUE LOOP | (2 CYCLES) |
| 877 | | ; | | | 5 CYCLES HIGH | |
| 878 | | ; | | | | |
| 879 | 0517 C293 | OSC_SC: | CLR | FSK | ; THE FIRST CLOCK | (1 CYCLE) |
| 880 | 0519 782D | | MOV | R0,#45 | ; 45 X 11 USEC LOOP | (2 CYCLES) |
| 881 | 051B A3 | | INC | DPTR | ; | (2 CYCLES) |
| 882 | 051C D293 | | SETB | FSK | ; OUT HIGH | (1 CYCLE) |
| 883 | 051E A6 | | MUL | AB | ; | (4 CYCLES) |
| 884 | 051F 00 | | NOP | | ; | (1 CYCLE) |
| 885 | | ; | | | | |
| 886 | 0520 C293 | OUT_SC: | CLR | FSK | ; OUTPUT LOW | (1 CYCLE) |
| 887 | 0522 A4 | | MUL | AB | ; DUMMY INSTRUCTION | (4 CYCLES) |
| 888 | | ; | | | 5 CYCLES LOW | |
| 889 | 0523 D293 | | SETB | FSK | ; OUTPUT HIGH | (1 CYCLE) |
| 890 | 0525 A3 | | INC | DPTR | ; DUMMY | (2 CYCLES) |
| 891 | 0526 00 | | NOP | | ; DUMMY | (1 CYCLE) |
| 892 | 0527 D8F7 | | DJNZ | R0,OUT_SC | ; CONTINUE LOOP | (2 CYCLES) |
| 893 | | ; | | | 6 CYCLES HIGH | |
| 894 | 0529 8022 | | SJMP | TMER_OUT | | |
| 895 | | ; | | | | |
| 896 | 052B | XSTP_9: | | | | |
| 897 | 052B C293 | OSC_SD: | CLR | FSK | ; THE FIRST CLOCK | (1 CYCLE) |
| 898 | 052D 782D | | MOV | R0,#45 | ; 45 X 11 USEC LOOP | (2 CYCLES) |
| 899 | 052F A3 | | INC | DPTR | ; | (2 CYCLES) |
| 900 | 0530 D293 | | SETB | FSK | ; OUT HIGH | (1 CYCLE) |

Fig. 15Q

| | | | | | | |
|---|---|---|---|---|---|---|
| 901 | 0532 A4 | | MUL | AB | ; | (4 CYCLES) |
| 902 | 0533 00 | | NOP | | ; | (1 CYCLE) |
| 903 | | ; | | | | |
| 904 | 0534 C293 | OUT_SD: | CLR | FSK | ; OUTPUT LOW | (1 CYCLE) |
| 905 | 0536 A4 | | MUL | AB | ; DUMMY INSTRUCTION | (4 CYCLES) |
| 906 | | ; | | | 5 CYCLES LOW | |
| 907 | 0537 D293 | | SETB | FSK | ; OUTPUT HIGH | (1 CYCLE) |
| 908 | 0539 A3 | | INC | DPTR | ; DUMMY | (2 CYCLES) |
| 909 | 053A 00 | | NOP | | ; DUMMY | (1 CYCLE) |
| 910 | 053B D8F7 | | DJNZ | R0,OUT_SD | ; CONTINUE LOOP | (2 CYCLES) |
| 911 | | ; | | | 6 CYCLES HIGH | |
| 912 | 053F C293 | OSC_SE: | CLR | FSK | ; THE FIRST CLK | (1 CYCLE) |
| 913 | 053F 7831 | | MOV | R0,#49 | ; 49 X 10 USEC LOOP | (2 CYCLES) |
| 914 | 0541 A3 | | INC | DPTR | ; | (2 CYCLES) |
| 915 | 0542 D293 | | SETB | FSK | ; OUT HIGH | (1 CYCLE) |
| 916 | 0544 A4 | | MUL | AB | ; | (4 CYCLES) |
| 917 | | ; | | | | |
| 918 | 0545 C293 | OUT_SE: | CLR | FSK | ; OUTPUT LOW | (1 CYCLE) |
| 919 | 0547 A4 | | MUL | AB | ; DUMMY INSTRUCTION | (4 CYCLES) |
| 920 | | ; | | | 5 CYCLES LOW | |
| 921 | 0548 D293 | | SETB | FSK | ; OUTPUT HIGH | (1 CYCLE) |
| 922 | 054A A3 | | INC | DPTR | ; DUMMY | (2 CYCLES) |
| 923 | 054B D8F8 | | DJNZ | R0,OUT_SE | ; CONTINUE LOOP | (2 CYCLES) |
| 924 | | ; | | | 5 CYCLES HIGH | |
| 925 | | | | | | |
| 926 | | ; | | | | |
| 927 | 054D C293 | TMER_OUT | CLR | FSK | | |
| 928 | | ; | | | | |
| 929 | 054F 7803 | | MOV | R0,#3 | ; PRE LOAD 300 -- DELAY 3 MSEC | |
| 930 | 0551 7964 | LP_5: | MOV | R1,#100 | ; INNER LOOP | |
| 931 | 0553 A4 | LP_100: | MUL | AB | ; 4 USEC | |
| 932 | 0554 A4 | | MUL | AB | ; 4 USEC | |
| 933 | 0555 D9FC | | DJNZ | R1,LP#100 | | |
| 934 | 0557 D8F8 | | DJNZ | R0,LP_5 | | |
| 935 | | ; | | | | |
| 936 | 0559 C28B | | CLR | TCON.3 | ; CLEAR INT0 FLAG | |
| 937 | 055B C294 | | CLR | VX | ; TURN OFF VX OUTPUT | |
| 938 | | ; | | | | |
| 939 | 055D 32 | | RETI | | | |
| 940 | | ; | | | | |
| 941 | | ; | Subroutines to generate 100 khz or 90 khz oscillator frequency | | | |
| 942 | | ; | ******************************************************************** | | | |
| 943 | | | | | | |
| 944 | | ; | Routine to generate 490 usec 100 khz signal | | | |
| 945 | | ; | | | | |
| 946 | 055E C293 | OSC_A: | CLR | FSK | ; THE FIRST CLK | (1 CYCLE) |
| 947 | 0560 782F | | MOV | R0,#47 | ; 47 X 10 USEC LOOP | (2 CYCLES) |
| 948 | 0562 A3 | | INC | DPTR | ; | (2 CYCLES) |
| 949 | 0563 D293 | | SETB | FSK | ; OUT HIGH | (1 CYCLE) |
| 950 | 0565 A4 | | MUL | AB | ; | (4 CYCLES) |
| 951 | | ; | | | | |
| 952 | 0566 C293 | OUT_L1: | CLR | FSK | ; OUTPUT LOW | (1 CYCLE) |
| 953 | 0568 A4 | | MUL | AB | ; DUMMY INSTRUCTION | (4 CYCLES) |
| 954 | | ; | | | 5 CYCLES LOW | |
| 955 | 0569 D293 | | SETB | FSK | ; OUTPUT HIGH | (1 CYCLE) |
| 956 | 056B A3 | | INC | DPTR | ; DUMMY | (2 CYCLES) |
| 957 | 056C D8F8 | | DJNZ | R0,OUT_L1 | ; CONTINUE LOOP | (2 CYCLES) |

Fig. 15R

| | | | | | | |
|---|---|---|---|---|---|---|
| 958 | | ; | | | 5 CYCLES HIGH | |
| 959 | 056E C293 | | CLR | FSK | ; THE LAST CYCLE | (1 CYCLE) |
| 960 | 0570 A4 | | MUL | AB | ; | (4 CYCLES) |
| 961 | 0571 D293 | | SETB | FSK | ; OUT HIGH | (1 CYCLE) |
| 962 | 0573 00 | | NOP | | ; | (1 CYCLE) |
| 963 | 0574 00 | | RET | | ; COMPLETE LOOP | (1 CYCLE) |
| 964 | | ; | | | | |
| 965 | | ; | | | Routine to generate 490 usec 90 khz signal | |
| 966 | | ; | | | | |
| 967 | 0575 C293 | OSC_9: | CLR | FSK | ; THE FIRST CLOCK | (1 CYCLE) |
| 968 | 0577 782B | | MOV | R0,#43 | ; 43 X 10 USEC LOOP | (2 CYCLES) |
| 969 | 0579 A3 | | INC | DPTR | ; | (2 CYCLES) |
| 970 | 057A D293 | | SETB | FSK | ; OUT HIGH | (1 CYCLE) |
| 971 | 057C A4 | | MUL | AB | ; | (4 CYCLES) |
| 972 | 057D 00 | | NOP | | ; | (1 CYCLE) |
| 973 | | ; | | | | |
| 974 | 057E C293 | OUT_L2: | CLR | FSK | ; OUTPUT LOW | (1 CYCLE) |
| 975 | 0580 A4 | | MUL | AB | ; DUMMY INSTRUCTION | (4 CYCLES) |
| 976 | | ; | | | 5 CYCLES LOW | |
| 977 | 0581 D293 | | SETB | FSK | ; OUTPUT HIGH | (1 CYCLE) |
| 978 | 0583 A3 | | INC | DPTR | ; DUMMY | (2 CYCLES) |
| 979 | 0584 00 | | NOP | | ; DUMMY | (1 CYCLE) |
| 980 | 0585 D8F7 | | DJNZ | R0,OUT_12 | ; CONTINUE LOOP | (2 CYCLES) |
| 981 | | ; | | | 6 CYCLES HIGH | |
| 982 | 0587 C293 | | CLR | FSK | ; THE LAST CYCLE | (1 CYCLE) |
| 983 | 0589 A4 | | MUL | AB | ; | (4 CYCLES) |
| 984 | 058A D293 | | SETB | FSK | ; OUT HIGH | (1 CYCLE) |
| 985 | 058C 00 | | NOP | | ; | (1 CYCLE) |
| 986 | 085D 22 | | RET | | ; COMPLETE LOOP | (1 CYCLE) |
| 987 | | ; | | | | |
| 988 | | ; | | | | |
| 989 | | ; | | | Routine to generate 240 usec 100 khz then 250 usec 90 khz signal | |
| 990 | | ; | | | | |
| 991 | 058E C293 | OSC_A_9: | CLR | FSK | ; THE FIRST CLOCK | (1 CYCLE) |
| 992 | 0590 7817 | | MOV | R0,#23 | ; 24 X 10 USEC LOOP | (2 CYCLES) |
| 993 | 0592 A3 | | INC | DPTR | ; | (2 CYCLES) |
| 994 | 0593 D293 | | SETB | FSK | ; OUT HIGH | (1 CYCLE) |
| 995 | 0595 A4 | | MUL | AB | ; | (4 CYCLES) |
| 996 | | ; | | | | |
| 997 | 0596 C293 | OUT_L3: | CLR | FSK | ; OUTPUT LOW | (1 CYCLE) |
| 998 | 0598 A4 | | MUL | AB | ; DUMMY INSTRUCTION | (4 CYCLES) |
| 999 | | ; | | | 5 CYCLES LOW | |
| 1000 | 0599 D293 | | SETB | FSK | ; OUTPUT HIGH | (1 CYCLE) |
| 1001 | 059B A3 | | INC | DPTR | ; DUMMY | (2 CYCLES) |
| 1002 | 059C D8F8 | | DJNZ | R0,OUT_L3 | ; CONTINUE LOOP | (2 CYCLES) |
| 1003 | | ; | | | 5 CYCLES HIGH | |
| 1004 | | ; | | | COMPLETE 250 USEC @ 100 KHZ | |
| 1005 | | ; | | | | |
| 1006 | 059E C293 | | CLR | FSK | ; 90 KHZ FIRST CLOCK | (1 CYCLE) |
| 1007 | 05A0 7815 | | MOV | R0,#21 | ; 21 X 11 USEC LOOP | (2 CYCLES) |
| 1008 | 05A2 A3 | | INC | DPTR | ; | (2 CYCLES) |
| 1009 | 05A3 D293 | | SETB | FSK | ; OUT HIGH | (1 CYCLE) |
| 1010 | 05A5 A4 | | MUL | AB | ; | (4 CYCLES) |
| 1011 | 05A6 00 | | NOP | | ; | (1 CYCLE) |
| 1012 | | ; | | | | |
| 1013 | 05A7 C293 | OUT_L4: | CLR | FSK | ; OUTPUT LOW | (1 CYCLE) |
| 1014 | 05A9 A4 | | MUL | AB | ; DUMMY INSTRUCTION | (4 CYCLES) |

Fig. 15S

| | | | | | | |
|---|---|---|---|---|---|---|
| 1015 | | ; | | | 5 CYCLES LOW | |
| 1016 | 05AA D293 | | SETB | FSK | ; OUTPUT HIGH | (1 CYCLE) |
| 1017 | 05AC A3 | | INC | DPTR | ; DUMMY | (2 CYCLES) |
| 1018 | 05AD 00 | | NOP | | ; DUMMY | (1 CYCLE) |
| 1019 | 05AE D8F7 | | DJNZ | R0,OUT_L4 | ; CONTINUE LOOP | (2 CYCLES) |
| 1020 | | ; | | | 6 CYCLES HIGH | |
| 1021 | 05B0 C293 | | CLR | FSK | ; THE LAST CLOCK | (1 CYCLE) |
| 1022 | 05B2 A4 | | MUL | AB | ; | (4 CYCLES) |
| 1023 | 05B3 D293 | | SETB | FSK | ; OUT HIGH | (1 CYCLE) |
| 1024 | 05B5 00 | | NOP | | ; | (1 CYCLE) |
| 1025 | 05B6 22 | | RET | | ; TOTAL OF 500 USEC | (1 CYCLE) |
| 1026 | | ; | | | | |
| 1027 | | ; | Routine to generate 240 usec 90 khz then 250 usec 100 khz signal | | | |
| 1028 | | ; | | | | |
| 1029 | 05B7 C293 | OSC_9_A: | CLR | FSK | ; 90 KHZ FIRST CLOCK | (1 CYCLE) |
| 1030 | 05B9 7816 | | MOV | R0,#22 | ; 22 X 11 USEC LOOP | (2 CYCLES) |
| 1031 | 05BB A3 | | INC | DPTR | ; | (2 CYCLES) |
| 1032 | 05BC D293 | | SETB | FSK | ; OUT HIGH | (1 CYCLE) |
| 1033 | 05BE A4 | | MUL | AB | ; | (4 CYCLES) |
| 1034 | 05BF 00 | | NOP | | ; | (1 CYCLE) |
| 1035 | | ; | | | | |
| 1036 | 05C0 C293 | OUT_L5: | CLR | FSK | ; OUTPUT LOW | (1 CYCLE) |
| 1037 | 05C2 A4 | | MUL | AB | ; DUMMY INSTRUCTION | (4 CYCLES) |
| 1038 | | ; | | | 5 CYCLES LOW | |
| 1039 | 05C3 D293 | | SETB | FSK | ; OUTPUT HIGH | (1 CYCLE) |
| 1040 | 05C5 A3 | | INC | DPTR | ; DUMMY | (2 CYCLES) |
| 1041 | 05C6 00 | | NOP | | ; DUMMY | (1 CYCLE) |
| 1042 | 05C7 D8F7 | | DJNZ | R0,OUT_L5 | ; CONTINUE LOOP | (2 CYCLES) |
| 1043 | | ; | | | 6 CYCLES HIGH | |
| 1044 | | ; | | | | |
| 1045 | 05C9 C293 | | CLR | FSK | ; THE FIRST CLOCK | (1 CYCLE) |
| 1046 | 05CB 7817 | | MOV | R0,#23 | ; 23 X 10 USEC LOOP | (2 CYCLES) |
| 1047 | 05CD A3 | | INC | DPTR | ; | (2 CYCLES) |
| 1048 | 05CE D293 | | SETB | FSK | ; OUT HIGH | (1 CYCLE) |
| 1049 | 05D0 A4 | | MUL | AB | ; | (4 CYCLES) |
| 1050 | | ; | | | | |
| 1051 | 05D1 C293 | OUT_L6: | CLR | FSK | ; OUTPUT LOW | (1 CYCLE) |
| 1052 | 05D3 A4 | | MUL | AB | ; DUMMY INSTRUCTION | (4 CYCLES) |
| 1053 | | ; | | | 5 CYCLES LOW | |
| 1054 | 05D4 D293 | | SETB | FSK | ; OUTPUT HIGH | (1 CYCLE) |
| 1055 | 05D6 A3 | | INC | DPTR | ; DUMMY | (2 CYCLES) |
| 1056 | 05D7 D8F8 | | DJNZ | R0,OUT_L6 | ; CONTINUE LOOP | (2 CYCLES) |
| 1057 | | ; | | | 5 CYCLES HIGH | |
| 1058 | 05D9 C293 | | CLR | FSK | ; THE LAST CLOCK | (1 CYCLE) |
| 1059 | 05DB A4 | | MUL | AB | ; | (4 CYCLES) |
| 1060 | 05DC D293 | | SETB | FSK | ; OUT HIGH | (1 CYCLE) |
| 1061 | 05DE 00 | | NOP | | ; | (1 CYCLE) |
| 1062 | 05DF 22 | | RET | | ; TOTAL OF 500 USEC | (1 CYCLE) |
| 1063 | | ; | | | | |
| 1064 | | ; | | | | |
| 1065 | | ; Timer to generate 1 msec time delay | | | | |
| 1066 | | ; | | | | |
| 1067 | 05E0 7864 | TMER_1: | MOV | R0,#100 | | |
| 1068 | 05E2 A4 | LOP_1: | MUL | AB | ; 4 USEC | |
| 1069 | 05E3 A4 | | MUL | AB | ; 4 USEC | |
| 1070 | 05E4 D8FC | | DJNZ | R0,LOP_1 | ; 2 USEC | |
| 1071 | 05E6 22 | | RET | | | |

| | | | | |
|---|---|---|---|---|
| 1072 | | ; | | |
| 1073 | 05E7 | | END | ;END OF XPONDER PROGRAM |

Errors: None
Bytes: 1451
Crc: A4DE

\*\*\*\*\*\*\*\*\*\*\*\*\*\*
\* VXPNDB \*
\*\*\*\*\*\*\*\*\*\*\*\*\*\*

Fig. 15T

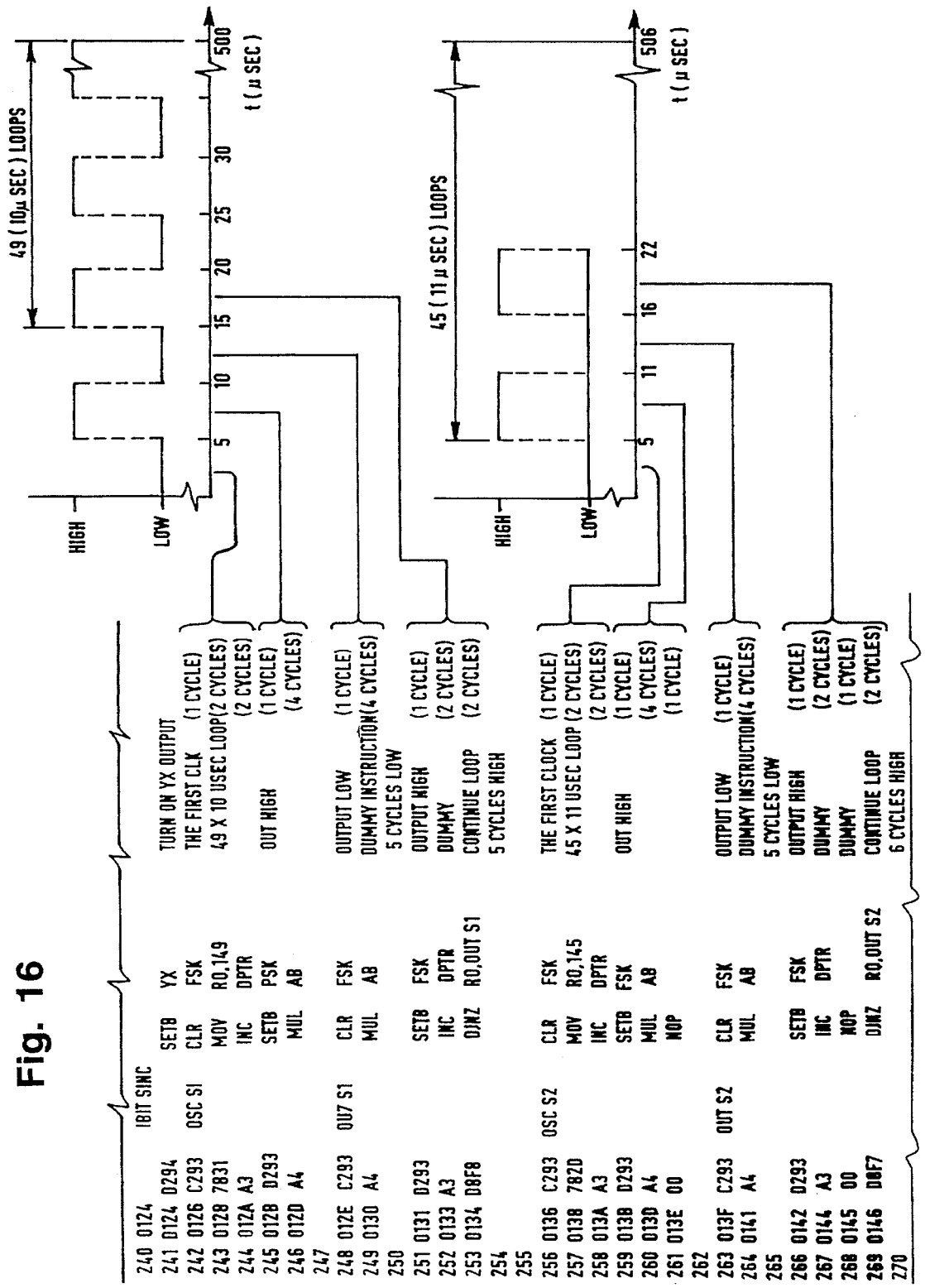

Fig. 17

VEHICLE TRANSPONDER DATA BITS [LEAD CAB]

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| BINARY WEIGHT | | 1 | 2 | 4 | 8 | 16 | 32 | 64 | | | 1 | 2 | 4 | 8 | 16 | 32 | | | 64 |
| VEHICLE IDENTIFICATION | L | R | R | R | R | R | R | R | SP | SP | T | T | T | T | T | T | SP | SP | T |
| LOGIC LEVEL | 1 | X | X | X | X | X | X | X | X | X | X | X | X | X | X | X | | | X |

29

L = TRANSPONDER LOCATION
T = VEHICLE IDENTIFICATION NUMBER
SP = SPARE
R = VEHICLE ROUTE NUMBER

TRANSPONDER HAVING MICROPROCESSOR GENERATED FREQUENCY SHIFT SIGNALS

BACKGROUND OF THE INVENTION

This invention relates generally to an automatic identification of a transponder on an object responsive to a signal from a remote interrogating station, and more particularly to an improved transponder.

Transponders of the type disclosed herein can be mounted on vehicles, and in response to an interrogating signal from a remote interrogator, transmit information previously recorded and stored in the transponder relating to vehicular identification and/or other data necessary for management and operational control of vehicles such as trucks, buses, or rail vehicles operating on rails, including freight, locomotive, and mass transit passenger cars. Some applications, however, utilize a moving interrogator mounted on the vehicle and a stationary transponder in order to establish position or location of the vehicle and/or to transmit other information to operators of the vehicle.

Presently, known vehicular identification systems employ a transponder such as disclosed in U.S. Pat. No. 3,918,057, for use in a system disclosed and claimed in U.S. Pat. No. 4,068,211. The specification and figures of U.S. Pat. No. 4,068,211 is hereby incorporated by reference. The system and transponder disclosed herein utilize the well known frequency shift keying (FSK) method wherein carriers of two frequencies are modulated or shifted in bit format to contain information stored in the transponder for transmission from a moving transponder to a fixed location interrogator. This information is encoded through a transmitted string of digital non-return to zero (NRZ) bits coded by shifts from one frequency to another over a fixed time period. These presently used devices utilize conventional or Colpits or Hartley oscillators to generate the dual frequencies required from FSK signaling.

Although this type of transponder is in use generally speaking, operational difficulties have been encountered, primarily with the frequency generating means due to frequency stability, sensitivity to the proximity of ferrous materials and temperature sensitively of the frequency generating oscillators.

The transponder of this invention overcomes these objections and provides further advantages through the use of a programmed microprocessor.

Therefore, it is an object of this invention to provide a frequency shift keyed (FSK) transponder for use with existing interrogators having improved frequency stability through incorporation of a microprocessor having a highly accurate internal crystal controlled frequency.

It is an additional object of this invention to provide an improved FSK transponder wherein microprocessor programming precisely controls the generation of frequency shift keyed signals for transmission to a remote interrogator.

It is an additional object of this invention to provide a frequency shift keyed transponder utilizing microprocessor programming to insure accurate transmission of stored information through verification of the content of each information bit transmitted on each transmission cycle.

It is a further object of this invention to provide a frequency shift keyed transponder wherein shift frequencies, stored information, and handling of other data can be conveniently modified and/or improved through microprocessor programming.

SUMMARY OF THE INVENTION

A transponder generates coded frequency shift keyed signals according to data stored internally using non-volatile means. The FSK signal is generated by programming a microprocessor having intrinsic cycle time which is a substantial sub-multiple of the output FSK signals. Using a crystal controlled microprocessor having a cycle time substantially divided down from the initial crystal frequency, a highly accurate form of generating frequencies required for FSK transmission has been discovered. Generating proper frequencies is accomplished through microprocessor programming which includes a precise number of integral microprocessor cycles during predetermined time intervals, thereby providing highly accurate shift frequencies occupying equally accurate shift or signal periods.

As programmed, the microprocessor of the transponder generates a data bit stream according to the above mentioned stored input information on each overall program cycle. Although as disclosed herein, input information is stored by wired open and closed contacts, other means, such as remotely controlled switches or information stored in the microprocessor data memory, can be used as well. Since each data transmission cycle includes reexamination of stored data, and utilizes the aforementioned highly accurate crystal controlled microprocessor cycling, transponder stored data is transmitted by signals having highly accurate frequencies and time periods.

BRIEF DESCRIPTION OF THE DRAWINGS (Note that all flow diagrams show associated instruction numbers of FIG. 15.)

Figure 3A:
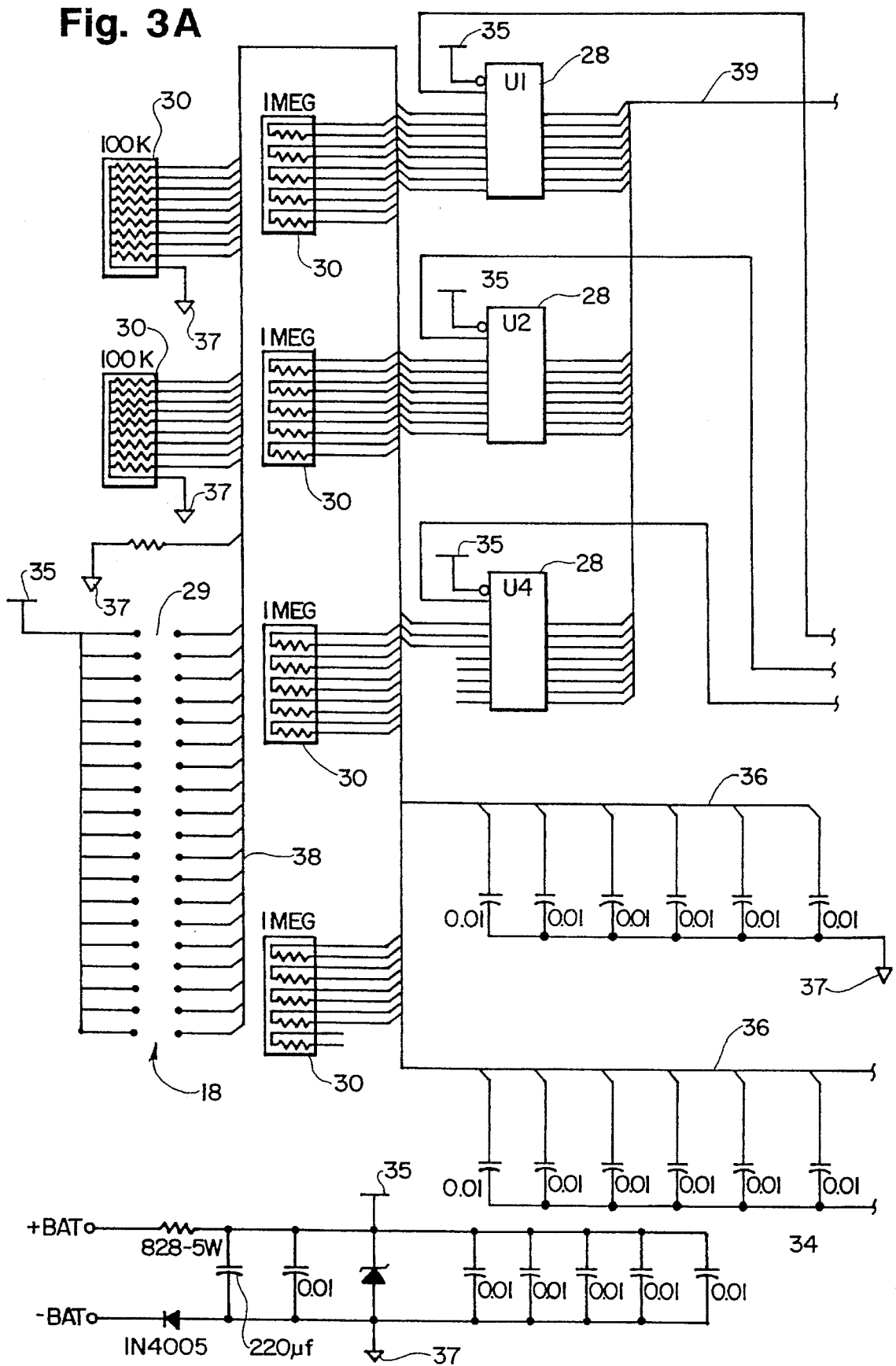
Figure 3C:
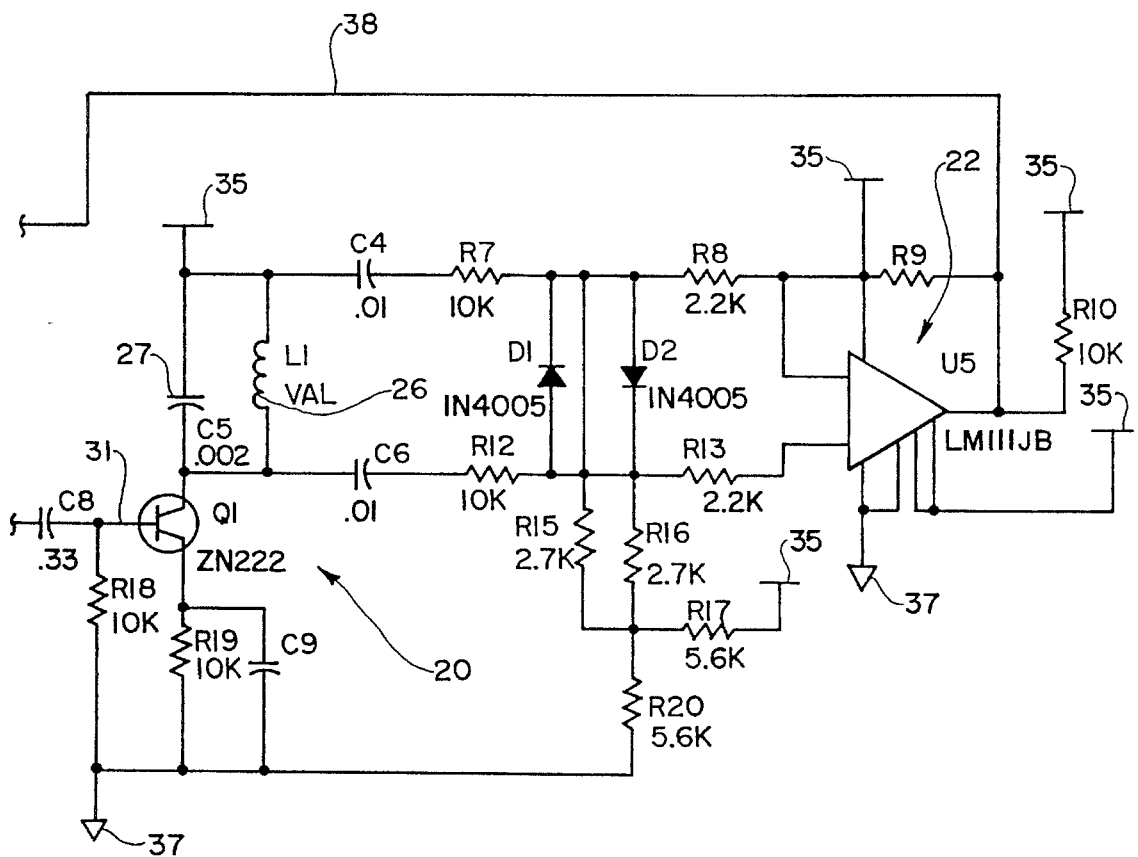

FIGS. 3A, 3B and 3C comprise a transponder schematic system diagram particularly showing digital devices employed and associated information input, information bus filtering, and transmit/receive circuitry.

Figure 4:
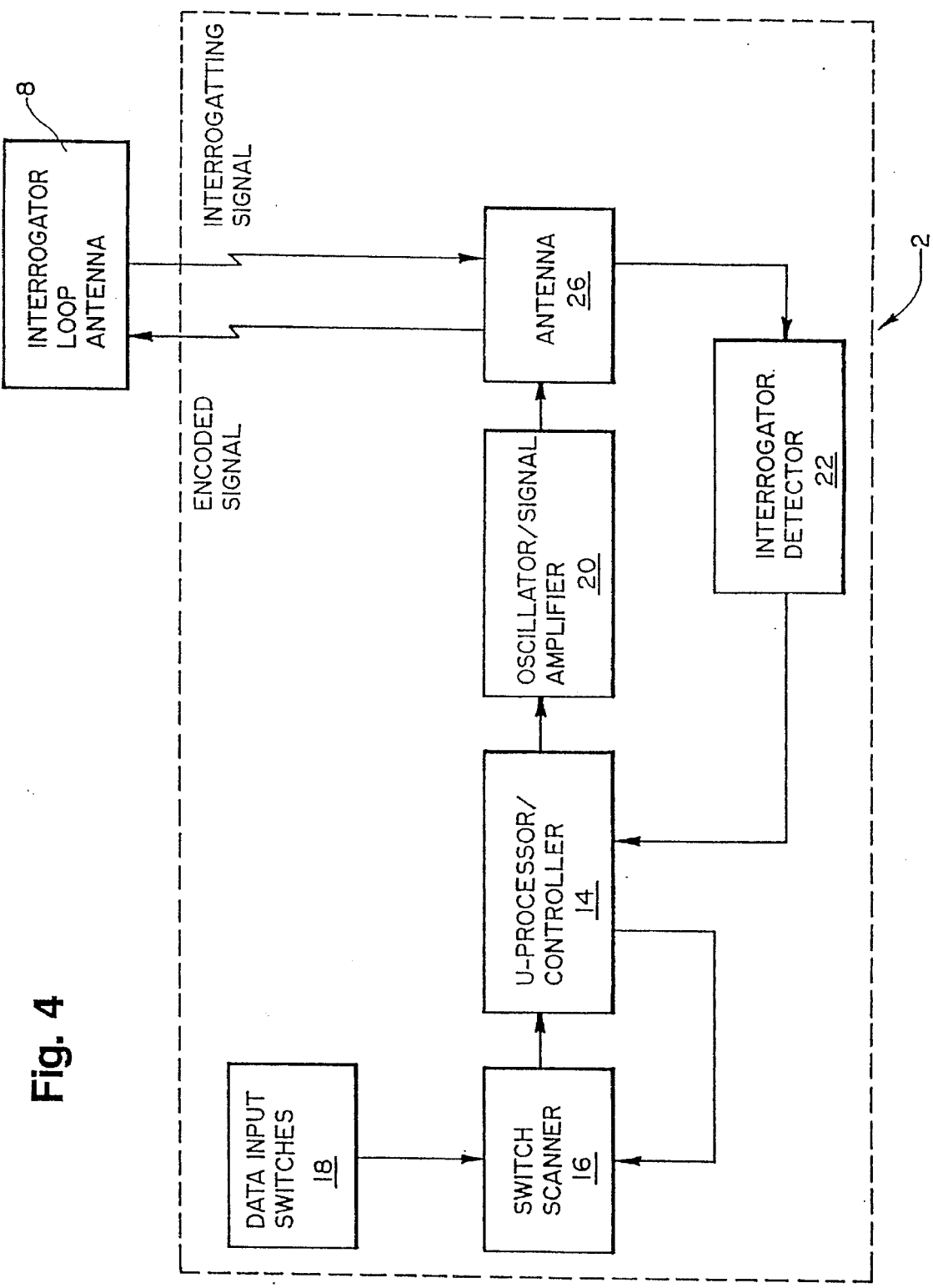

FIG. 4 is a functional block diagram of the transponder, particularly showing major signal flows.

Figure 5:
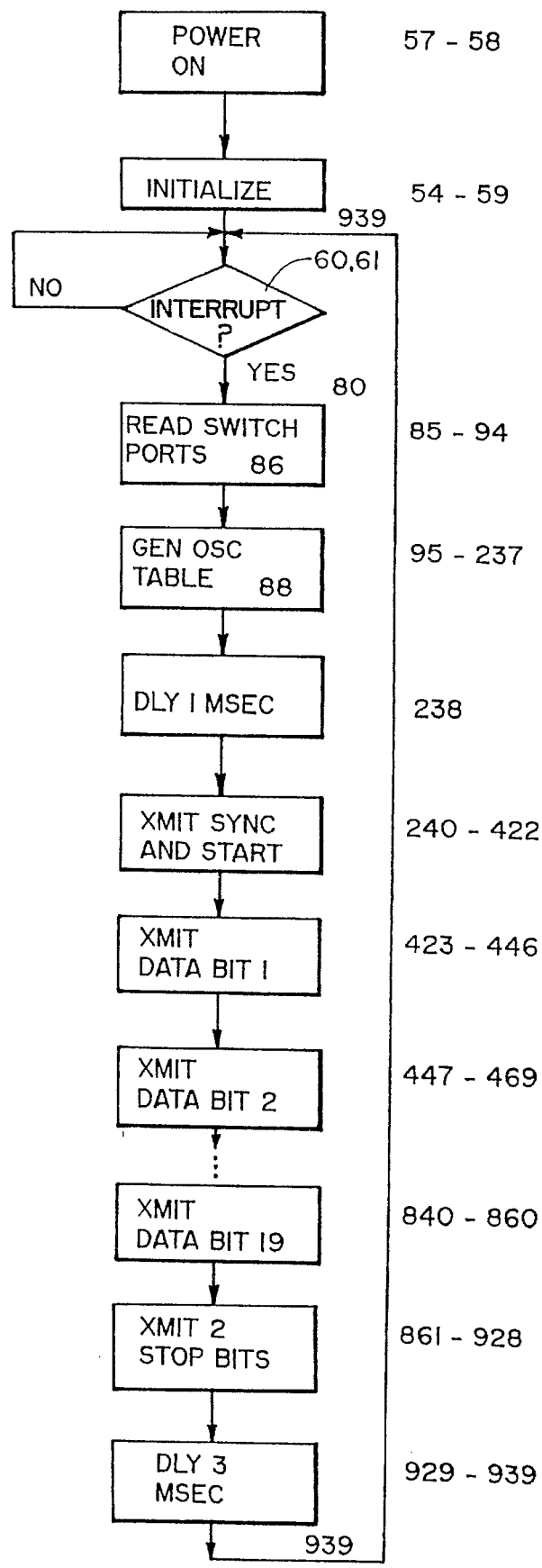

FIG. 5 is a block diagram of the program used in the microprocessor portion of the transponder of the invention, particularly showing microprocessor instructions of FIG. 5 associated with the operations shown.

Figure 6:
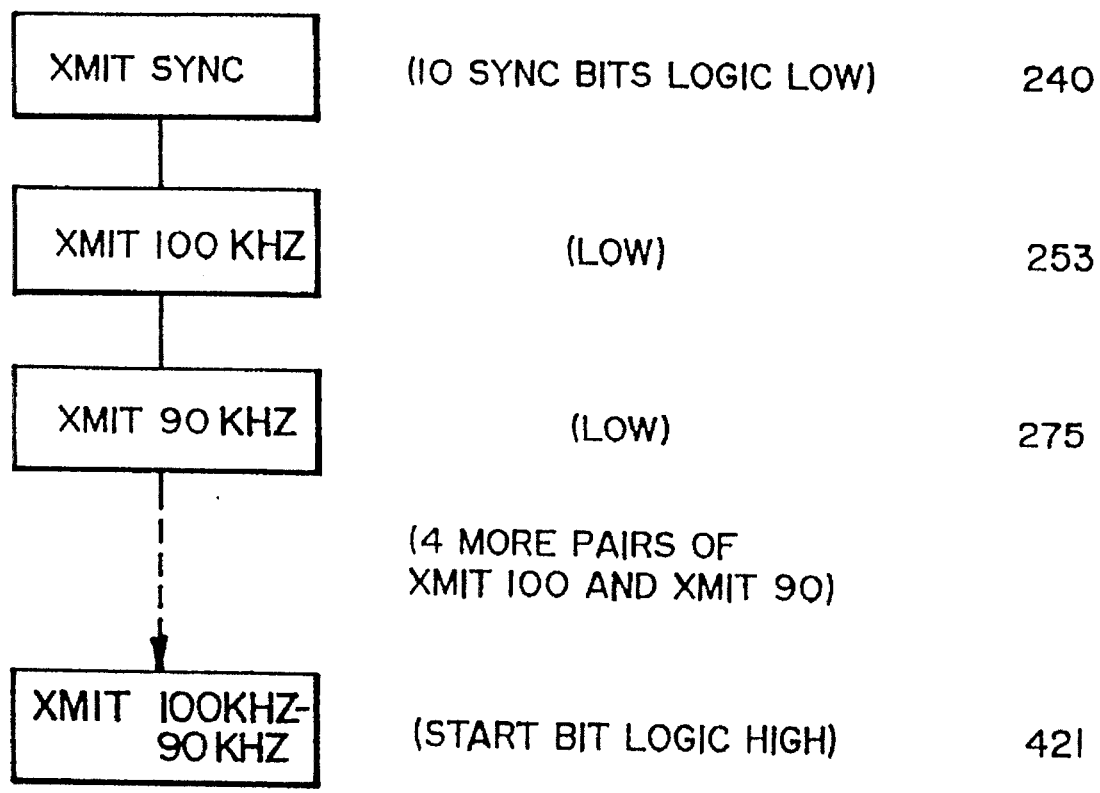

FIG. 6 is a block diagram of the microprocessor operation and instructions used to generate the synchronization bit.

Figure 7:
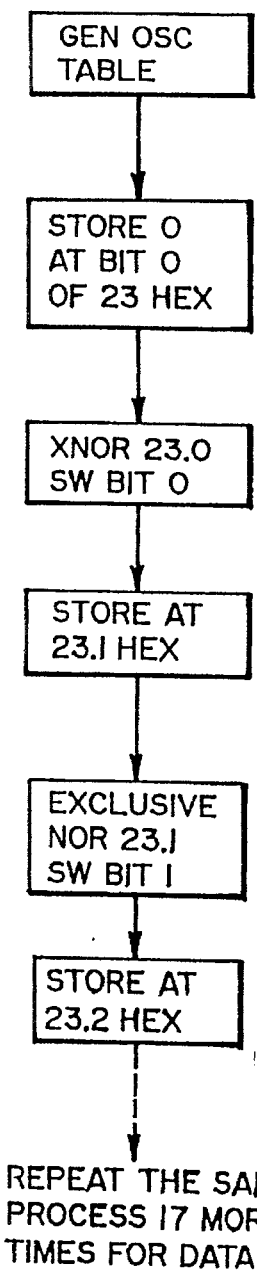

FIG. 7 is a block diagram of the oscillator table portion of a microprocessor operation and instruction numbers of the program used to generate signal frequency bits, particularly showing use of an exclusive NOR to generate the next sequential signal frequency bit of information transmission.

Figure 8:
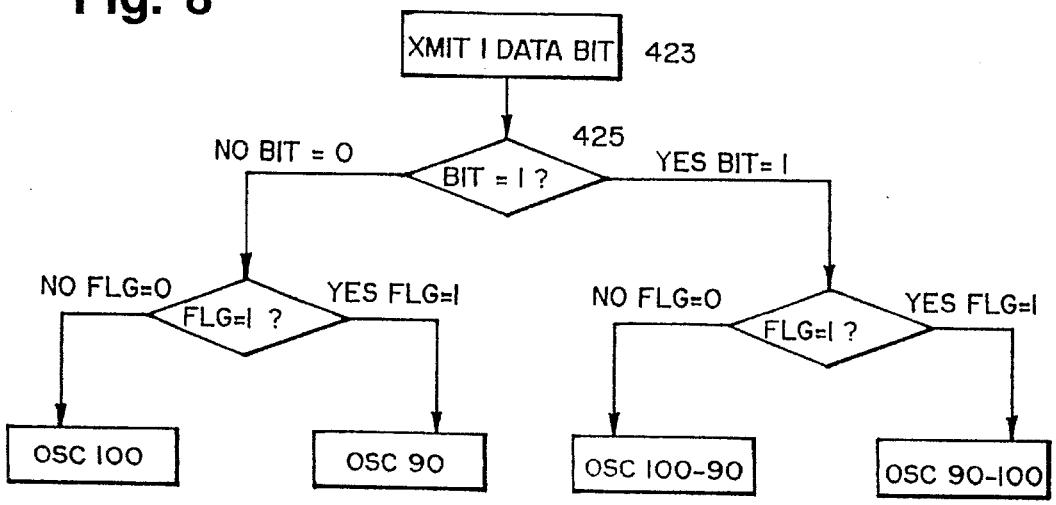

FIG. 8 is a block diagram of a portion of the microprocessor program of the invention, particularly showing generation of an information bit. Based on reading settings of switches at 65 of FIG. 17 by switch scanner 16 and present at switch ports of microprocessor 14, at 424 of FIG. 16. Prior flag settings (Reference FIG. 16, 96–236) establish information or data bit transmission (Reference FIG. 5).

Figure 9:
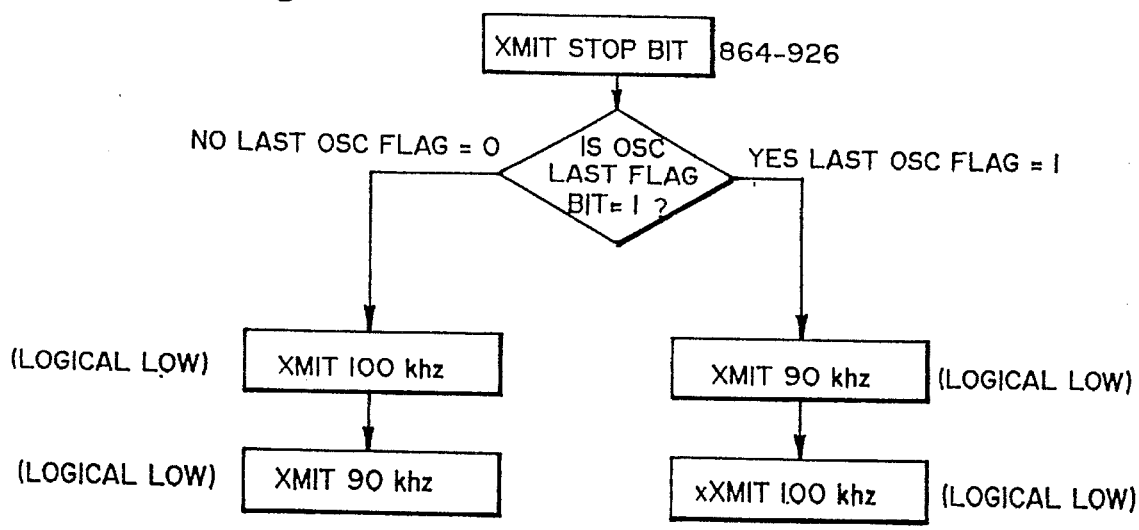

FIG. 9 is a block diagram of a portion of the microprocessor program utilized to generate a stop bit (Reference FIG. 5) of the transponder signal transmission.

Figure 10:
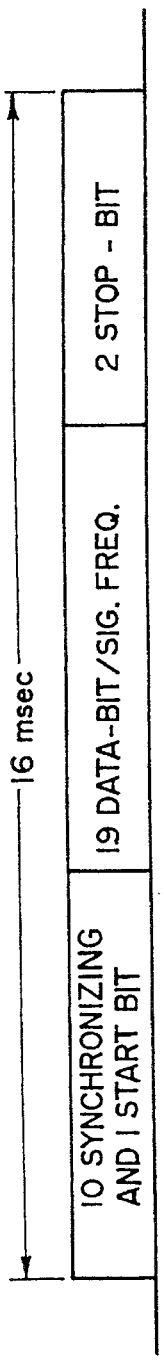

FIG. 10 is a graphic depiction of a transponder information transmission, particularly showing the bit strings of the synchronizing and start bits, the signal frequency or information bits, and stop bits.

Figure 11:
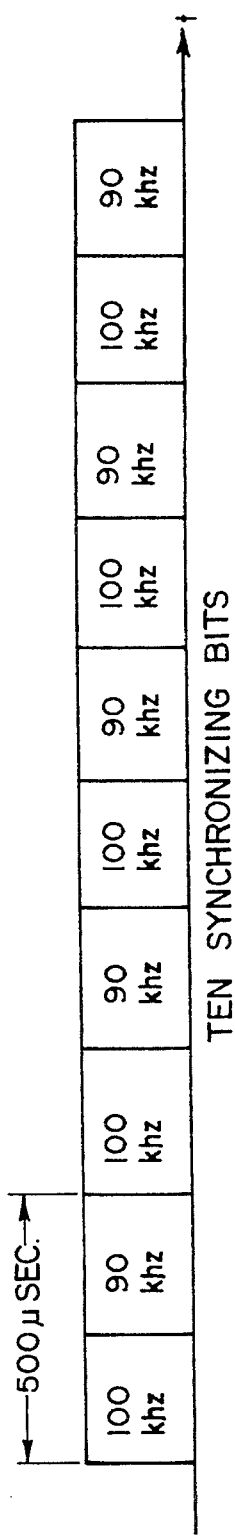

FIG. 11 is a graphic depiction of a typical synchronization bit, particularly showing the oscillating frequency pattern and bit/frequency periods.

Figure 12:
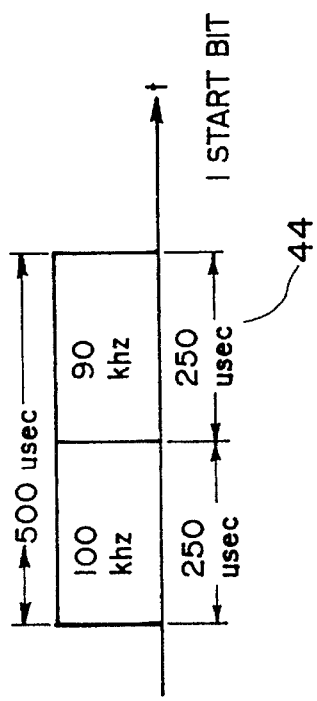

FIG. 12 is a graphic depiction of the start bit, particularly showing its variable or shifting frequency pattern.

FIG. 13 is a table containing graphic depictions of the switch bit patterns of the invention, particularly showing the relationship between the information input bits from individual switches 29 of buffer 28, and particularly the last bit frequency in its relation to the next oscillating bit frequency pattern.

FIG. 14 is a table containing graphic depictions of two stop bits particularly showing the relationship between the last information bit oscillating bit frequency and the stop bit frequency pattern.

FIGS. 15A through 15T constitute is a complete instruction set written in assembler, particularly showing by line sequence all operational steps referred to in FIGS. 9 through 13, including subroutine for generating FSK signals.

FIG. 16 is a breakout of FIG. 15d, particularly showing, in graphic form, the generation of 100 Khz and 90 Khz frequency shift keyed (FSK) signals.

FIG. 17 is a "typical" encoding table, particularly showing information bit switch positions for data input.

DETAILED DESCRIPTION OF THE INVENTION

Figure 1:
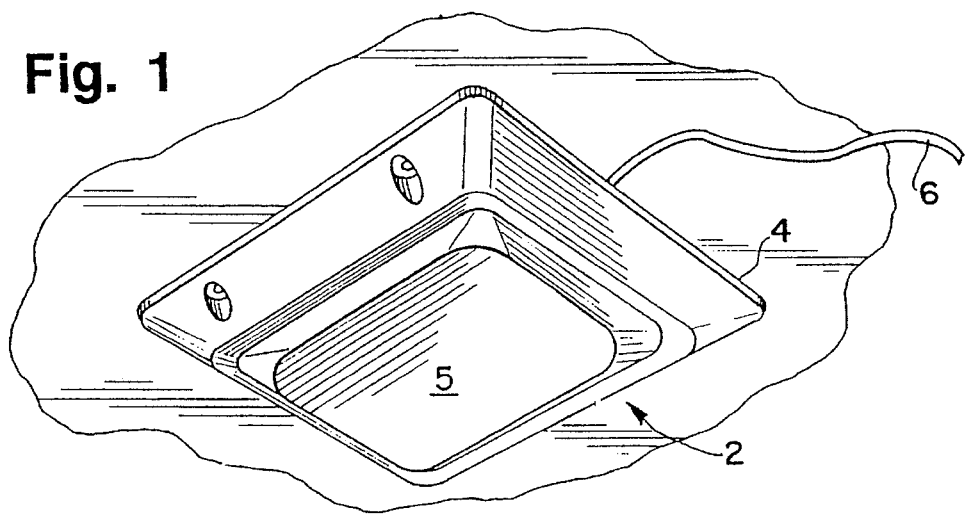
FIG. 1 shows a "typical" transponder in perspective, particularly showing vehicular mounting means and of the transponder antenna location.
Figure 2:
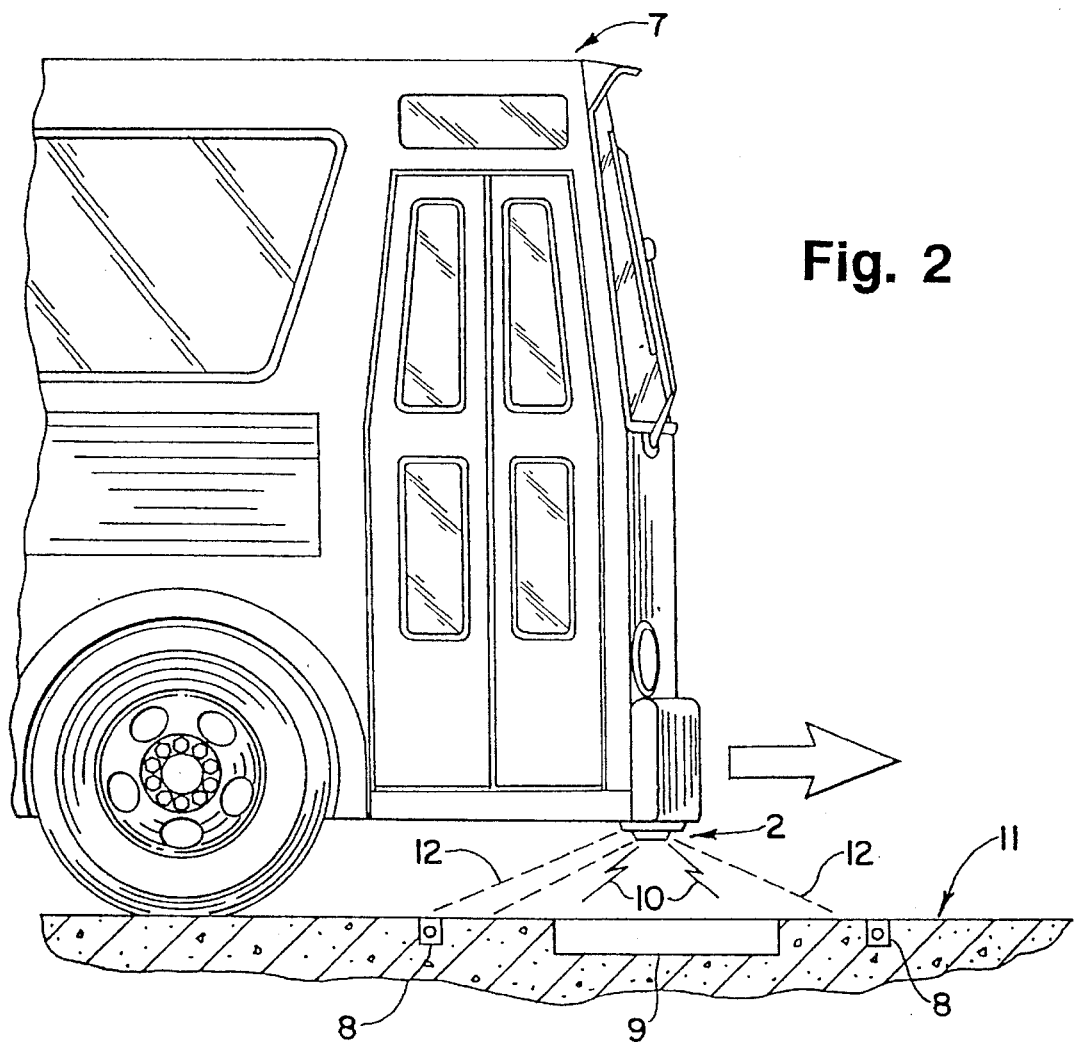
FIG. 2 is a depiction of the transponder of the invention mounted on a vehicle, particularly showing the relationship between transponder and interrogating loop or antenna for a roadway application.

In reference to FIGS. 1 and 2, the system comprises a transponder assembly 2 in a suitable housing 5 having perimeter means for vehicular mounting 4, and cabled lead assembly 6 for supplying input power and in some cases data input through remote encoding of the transponder information bits.

The system further comprises, with reference to FIG. 2, a particular vehicle 7 having the transponder assembly 2 mounted underneath or immediately adjacent to the under body of the vehicle. Cooperating with the transponder in sending interrogating signals and receiving data is a road mounted loop 8 mounted on or embedded on a road surface 11 generating an electromagnetic frequency field or transponder capture pattern 10 for reception via the transponder's antenna having a receiving field pattern or capture zone approximated by the lines 12. In an alternative installation an antenna array 9 can be used to array configured to generate a similar capture pattern. A remote interrogating station (not shown) is suitably connected to the loop 8 or antenna 9 for sending a triggering or start-up signal to the transponder and subsequently receiving data relative to the vehicle via an antenna on the transponder. Interrogator signals are periodically transmitted, typically in the following sequence;
A 2 millisecond 100KHZ transponder start-up transmission.
A 16 millisecond interval for transponder response.
A 6 millisecond interval for interrogator processing.

With reference to FIG. 3A, 3B and 3C the transponder of the invention comprises a micro-controller 14 of the type manufactured by Signetics Model 87C751 or other equivalent units, having input ports read by program commands to provide a virtual operating switch scanner 16 for interfacing data input switch assembly 18. As shown, assembly 18 incorporates nineteen manual electrical two-position switches 29. The transponder further comprises a signal amplifier 20, an interrogator signal detector 22 (typically LM-111, manufactured by National Semiconductor), and a transmit/receive antenna 26 cooperating in signal communication as shown with the above mentioned road mounted antenna 8.

In further reference to FIGS. 3A, 3B and 3C, there is shown an input/output latch 32, a data input switch assembly 18 and associated buffers 28 (buffers and latches shown). Also shown are buffer ballast resistors 30 utilized in cooperation with data input switch assembly 18 in order to establish the voltage level of specific information bits as microprocessor highs or lows through jumpering or leaving unconnected the sequence of switch terminals designated as 29. As discussed above, remotely operated switches or microprocessor data memory could be used as well. A typical information input table showing a configuration of switches 28 is shown in FIG. 17. Use of the input data "switches" 29 in encoding the transponder will be discussed in some detail below.

The transponder further comprises a vehicle voltage supply filter assembly 34 having an output voltage terminal 35 and information bit switch filter assembly 36 for shunting extraneous noise and signals to circuit ground or return 37. The transponder elements are interconnected through a conventional data bus 39. Operating power for the transponder is typically supplied from the vehicle's electrical system although a suitable battery can be used, and is filtered by the above-mentioned multiple stage voltage limiting and noise filter 34.

In operation, the microprocessor 14 driven by its crystal controlled pulse generator 15, in this case operating at 12 Mhz, cyclically moves through its instruction set (reference FIG. 15). However, in the absence of an interrogator start-up signal and subsequent interrupt signal along interrupt line 38, the microprocessor's internal executive routine does not initiate action beyond the interrupt detection command (Reference 60, 61 of FIG. 15) on the previously stored program.

Although the following description assumes a moving transponder and fixed interrogator, those skilled in the art will understand that an inverse configuration will operate as well, i.e., a stationary transponder and vehicular mounted and moving interrogator including its transmitting loop or antenna.

When a vehicle equipped with the transponder assembly 2 typically mounted as shown in FIG. 2, enters the capture field or radiation pattern 10 of the road mounted array 8, on reception of the 2 millisecond 100 Khz transponder start-up signal voltage is generated the transponder in antenna 26. The signal appears across the balanced inputs of the interrupter signal amplifier and detector 22, and, as those skilled in the arts will readily understand, is conditioned via the diode resistor and capacitor network associated with a balanced input. This input signal, appearing across the balanced inputs of detector 22 generates an interrupt signal on line 38 entering the interrupt port of the microprocessor 14, thereby initiating microprocessor action on the previously stored program shown in FIG. 15.

An alternate embodiment of the invention measures the period of the deleted interrogator signal and initiates microprocessor action on the previously stored program only if the received signal has a measured period falling within predetermined limits (i.e., 9 microseconds to 11 microseconds and/or 91 Khz to 111 Khz). This implementation reduces power consumption by minimizing the initiation of transponder transmission due to spurious non signals.

A further refinement of the alternate embodiment utilizes the measured period of the interrogation signal to extract information which has been encoded therein by varying the frequency of the transmitted interrogation signal. This information which could, for example, indicate the location of the interrogating device, information which would then be utilized by other systems on the vehicle.

Returning to the preferred embodiment, completion of the stored program of FIG. 15 results in generation of a frequency shift signal of appropriate frequencies carrying digital data in accordance with data provided by input switches 18 contained in the input switch assembly 29. Data input is presented to the microprocessor buffers 28 by various high and low signals due to open or closed state of switches 18.

In operation of the program cycle of FIG. 15, microprocessor outputs are handled by output line 31 of the microprocessor input/output latch 32.

Programmed information inputs via the data switches 18 in the form of 90 Khz and 100 Khz FSK signal strings are transmitted serially to the transistor base of transponder output signal amplifier 20 via the latch line 31. The signal bit string is by amplifier 20, and impressed across antenna 26 and tuning capacitor 27 via the collector circuit of transistor Q1 in amplifier 20, for electromagnetic transmission to the above mentioned remote interrogator via the road mounted loop or antenna 8 or 9 (Reference FIG. 2).

In operation, a remote interrogator (not shown) periodically transmits the sequence described above through the field 10, to transponder antenna 26. On reception of the 2 millisecond 100 Khz transponder start-up signal, by the transponder antenna 26, and amplifier 22, the microprocessor program activates interrupt line 38, the microprocessor input via interrupt line 38.

In keeping with the invention disclosed herein, further portions of the microprocessor program of FIG. 15 are utilized to generate the dual frequency FSK signal and provide additional signal processing and control operations. With particular reference to FIGS. 5 and 15, the following description will deal largely with the program block diagram of FIG. 5. Those skilled in the microprocessor arts will readily understand that functions shown in individual blocks of FIG. 5 correspond to commands of FIG. 15 indicated adjacent to said FIG. 5 blocks. The numbers, located to the right and adjacent to the blocks of FIG. 5, represent the particular instructions, listed on FIG. 15, used to program the microprocessor/controller 14.

A substantial amount of the microprocessor programming shown on FIG. 15 is written in typically used assembler microprocessor programming language, contains many "housekeeping" commands not essential to the description of the invention disclosed herein. In order to best describe the invention disclosed, the following description will deal largely with the major functional aspects of the blocks of FIG. 5. Detailed discussion of specific commands directly with applicant's invention as disclosed herein will be presented. It is expected that those skilled in the microprocessor arts will refer to the indicated and associated commands contained in FIG. 15 for a more detailed and thorough review of other portions of the program.

Returning to FIGS. 5 and 15, after power-up, an initialization sequence, the program searches for presence of an interrupt signal along line 38 of the transponder. If a signal from an adjacent interrogator is present, at 80, the master interrupt is enabled. If no interrupt signal were available on line 38, the program cycle, other than power on and initialization is continued with subsequent and continuing searches for the presence of an interrupt signal through operation of signal detector 22.

Given the presence of an interrupt signal, processing proceeds, at commands 85 and 86 to read the data input switch settings 18 of the transponder 2 after which settings 1 through 8 of data input switches 29 of switch assembly 18 are stored. Similarly at 88, switches 9 through 16 are read and stored. Reading and storage of the data input switches proceeds through command 94.

At 88 of the program diagram a table of oscillating signal frequencies is begun. As this procedure continues from command 95 through 237 to generate separate and distinct oscillating signal information bits in a similar manner, a detailed description of a procedure for a single information bit will be presented.

Reference to FIG. 15 will provide detailed information of a similar or identical nature for further description of the process. At command 95, the start bit shown in FIG. 12 and also shown in FIG. 11 is shown as 100/90 Khz. With particular reference to FIG. 12, there is shown a representative start bit diagram comprising a 250 microsecond period of 100 Khz bits and a following 250 microsecond period bit of 90 Khz. It should be noted that the subroutines for generating the particular bit/frequency combinations designated as signal information bits is disclosed as subroutines, generated by instructions 946 through 1062. In particular, the start bit subroutine is disclosed in instructions 989 through 1025.

For the start bit, generated as 100/90 Khz, reference to the bit choice diagram of FIG. 7 indicates that the oscillating table designation or flag for the start bit is "0".

Organization of the entire signal information bit is shown in FIG. 10 where proceeding from left to right a complete data transmission from the transponder is shown. With this bit sequence, on receipt of the above discussed interrupt signal, an initial 10 synchronizing bits to be described below, plus the above mentioned start bit, are initially transmitted to allow synchronization between transponder and interrogator. It should be noted (Reference FIG. 11) that the start bit trails 11 synchronous bits having the period/frequency content shown in FIG. 12. The entire transponder data transmission (Reference FIG. 10) consists of the above-mentioned stop and synchronous bits, 19 switch or data bits read as indicated above from data input switches 18 of FIG. 4, typically set according to the table of FIG. 17; and the final component of the complete transponder reference signal, two 500 MSEC stop, bits chosen as shown in FIG. 14.

In keeping with the invention disclosed herein, as shown in FIG. 5, the FSK bit frequency pattern content of all data bits as transmitted is verified on each cycle according to the logic required as shown in FIGS. 13 and 14. This insures that each transmission of stored data in the transponder is compared to the data input switch settings of data input assembly 29 prior to and during each complete data transmission, substantially reducing the probability of transmission errors.

Returning to FIGS. 5 and 15, the generation of data signal bits proceeds at 97 of FIG. 15, the determination of an oscillating pattern or flag for the second bit of the information contained in the data input switches 18 of data input assembly 29. At 98, the logical tests of FIGS. 9 and 13 are applied in that command XRL comprise an exclusive NOR as described in the above mentioned tables (Ref. FIGS. 7 and 9).

In particular, FIG. 9 depicts the logic applied in determining the next information bit based on the four possible combinations of the last bit and information stored after reading the bit switches of data input 18. The possible combinations are as shown in FIG. 13, essentially a "truth table" for the oscillating frequency pattern and encoded transmitting signal of the invention disclosed herein.

Proceeding through the above discussed tests, a bit is determined and stored. In commands 103 through 236, each individual bit of the 19 data bits are determined in a manner similar to that described above.

Turning to FIG. 5, at 238, a delay of one millisecond is introduced to insure completion of the above operations. At 240 the actual frequency shift keyed signal containing the information assembled according to the bit structure of FIG. 11 is generated for transmission. As the method of generating the bit string is a major aspect of the invention disclosed herein, operations in instructions 240 through 254 will be described in some detail as follows:

As indicated above, generation of a two-frequency frequency shift keyed signal comprised of information bits of 500 microsecond duration (reference FIGS. 10, 13 and 14) involves programming the microprocessor 14 so as to utilize its operating cycle to produce information bits comprising groups of microprocessor lows and highs of 90 and 100 Khz frequencies. Those skilled in microprocessor arts will understand that other frequencies and bit transfer timings can easily be achieved by modifying the program so as to change either the number of dummy cycles per loop or the number of loop repetitions per bit. The technique disclosed herein is utilized throughout the generation of the entire transmitted bit signal.

The following description shown in detail on FIG. 16 is, therefore, "typical" of the frequency shift generation process for transmitting information signals shown in complete detail by of FIG. 17.

Generation of the transponder FSK bits is done as shown in FIG. 16 through instruction commands 241 through 246. It should be noted that the combination of microprocessor cycles in each case comprises groups of five microprocessor cycles of microprocessor output voltage lows and highs. Reasons for this will become apparent on the following examination of the above mentioned instructions and FIG. 16.

At 242 a single clock cycle is executed.

At 243 49/10 microsecond loops are programmed in a two-cycle instruction.

At 244 a spacer or dummy cycle is introduced for two cycles, completing the five-cycle instruction set, providing a five-cycle microprocessor low.

At 245, the microprocessor output is set at high for a cycle.

At 246 the output high is continued for an additional four-cycles providing a sequential microprocessor high, also at five cycles.

At 248 and 249 a five-cycle instruction low is written.

At 251, 252 and 253 a five-cycle high instruction is complete. The instruction 253 is important in that the above specified 10 microsecond loop is continued.

The above described loop instruction provides 49 subsequent 10 microsecond cycles in addition to the initial 10 microsecond command cycles. The sequence results in a 500 microsecond period of information bits oscillating between low and high at 5 microsecond intervals. Since the period of a 100 Khz signal is in fact ten microseconds, the combination of 5 microseconds high and 5 microseconds low effectively generates a 100 Khz alternating (5 microseconds low/5 microseconds high) signal.

To generate the second of the frequency shift information signals required to transmit an FSK signal, i.e, a bit for transmission at 90 Khz, a similar procedure follows at instructions 256 through 269. The instruction 257 establishes the 90 Khz signal in that forty-five 11 microsecond loops are specified. As the time period of these loops is 495 microseconds, and as the instructions 256–258, and 259–261 are 5 and 6 microsecond microprocessor highs and lows, respectively, the above described pattern is continued. Succeeding instructions 263, 264 generate a five cycle low, and instructions 266 through 269 generate a 5 microsecond low, a 6 microsecond high, succeeded by 45 eleven microsecond repetitions of the preceding (6+5) microsecond cycles. This sequence generates 56 cycles of a 6(high)+ 5(low) 90.9 Khz data bit, essentially 90 Khz. The above described concept of organizing the loop and instruction sets in microprocessor lows/highs of approximately 5 cycles or 5 microseconds is continued to generate a 90 Khz signal.

Returning once again to FIG. 5, after transmission of the sync and start bits transmission of information bits 1 through 19 (reference FIGS. 11 and 12) is undertaken. This procedure occupies instructions 423 through 860 (Reference FIG. 15).

For the transmit stop block of FIG. 5, at instruction 860, the two stop bits of FIG. 14 are generated and transmitted in a manner shown in FIG. 14. At instruction 939 after a delay of three milliseconds in order to allow completion of microprocessor processing instructions, the cycle returns to interrupt function (Instructions 60,61) of FIG. 5 in order to determine the presence of an additional interrogating signal. As the process is cyclic, the transmission of information contained in data input switches 18 will continue on receipt of an interrogating signal.

With regard to the setting of data input switch assembly 18, FIG. 17 sets out a "typical" switch setting table for the switches 29, establishing a binary representation of information to be stored in the transponder for transmission as 19 data bits (reference FIG. 10).

As discussed above, sequential generation of alternate 90 and 100 Khz signals through programming varying cycles of microprocessor lows and highs in loops of varying time duration generates serial transmissions of the data contained in the data input switches 18 at the shift frequencies determined as disclosed herein. As disclosed in FIG. 17, completion of the instruction set insures that on each transmission the data input switches are read, thereby verifying the accuracy of subsequent data bits transmitted to the interrogator. Due to the capture area or distance of the road mounted interrogator antenna, repeated reception of the interrogator signal will result in many transmissions or reads of the stored transponder data providing redundant reads of said stored data, by a process which greatly enhances the accuracy of the transmitted information.

Therefore, we claim:

1. In a transponder for transmitting an electromagnetic signal based on previously stored information in said transponder, to a remote interrogating station when triggered by a signal transmitted from said station to said transponder, the improvement comprising:

a microprocessor in said transponder having a predetermined cycle time;

means programming said microprocessor for generating a first number of pulses, each said pulse having a period corresponding to a first multiple of said cycle time, said first multiple defining a first signal frequency;

means programming said microprocessor for generating a second number of pulses, said pulses occurring at a period corresponding to a second multiple of said cycle time, said second multiple defining a second signal frequency;

means generating groups of said first and second pulses, said groups defining a frequency shift keyed signal; and means modulating said frequency shift keyed signals in accordance with said stored information, thereby generating a transponder response to said interrogating station signal and, means in said transponder transmitting said frequency shift signals to said interrogating station.

2. The transponder of claim 1 wherein said programming means further comprises:

a predetermined number of fixed period microprocessor loops, each said loop having a duration equal to multiples of said microprocessor cycles;

a predetermined integral number of microprocessor high and microprocessor low outputs generated by each of said loops;

additional non-functional microprocessor cycles included in said microprocessor highs and lows in said program;

means combining said loops and non-functional cycles thereby defining a bit period;

means confining said frequency shift keyed signals to said bit period, thereby defining a signal frequency bit.

3. The transponder of claim 2 wherein said modulating means further comprises:

means in said transponder for entering and storing vehicular information in said microprocessor as information bit sequences, represented by microprocessor information bit lows and highs;

means converting said information bit lows and highs to corresponding sequential groups of said signal frequency bit groups, said signal frequency bits further comprising;

said first and second frequencies;

said second and first frequencies;

said first frequency;

said second frequency.

4. The transponder of claim 3 wherein said converting means further comprises:

means storing at least the last information bit of a prior bit group;

means identifying the end frequency of said last frequency bit;

means comparing said end bit frequency and next low or high information bit;

means distinguishing a next sequential information bit chosen from the group of;

first frequency bit, low information bit;

second frequency bit, low information bit;

first frequency bit, high information bit;

second frequency bit, high information bit.

5. In combination, a transponder mounted on a vehicle traversing a roadway, said transponder electromagnetically transmitting information relating to said vehicle to an adjacent interrogating station, when said transponder is signalled by said interrogator, comprising:

a microprocessor;

means storing information relating to a vehicle in said microprocessor;

means in said transponder receiving an interrogator signal, said means enabling said microprocessor;

means programming said microprocessor, for generating first and second frequency shift signals, said signals having first and second periods and duration, respectively;

means in said program modulating said signals, with said vehicular information; and, means in said transponder transmitting said frequency shift signals to said interrogator.

6. The transponder of claim 5 wherein said microprocessor and programming means further comprise:

means generating at least two time based alternating sequences of microprocessor "high" and microprocessor "low" pulses of predetermined period, each said period corresponding to an integral number of microprocessor clock cycles;

means in said programming means controlling said pulse periods and pulse durations, said pulse periods and pulse durations defining said frequency shaft signals.

* * * * *